(12) United States Patent
Day et al.

(10) Patent No.: US 12,333,301 B2
(45) Date of Patent: Jun. 17, 2025

(54) TRACE-BASED SURVEY FOR PULL REQUEST WORKFLOW

(71) Applicant: GM Cruise Holdings LLC, San Francisco, CA (US)

(72) Inventors: Stephen James Day, Kirkland, WA (US); Akhil Acharya, Cambridge, MA (US); Bianca Tamayo, San Francisco, CA (US); Ian Chiles, Charleston, SC (US); Andrew Lee, Mountain View, CA (US); Victor Robertson, San Francisco, CA (US); Chun-Shao Chu, San Jose, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 134 days.

(21) Appl. No.: 18/176,607

(22) Filed: Mar. 1, 2023

(65) Prior Publication Data
US 2024/0296044 A1 Sep. 5, 2024

(51) Int. Cl.
*G06F 9/54* (2006.01)
*G06F 8/30* (2018.01)
(Continued)

(52) U.S. Cl.
CPC ............... *G06F 8/71* (2013.01); *G06F 8/311* (2013.01); *G06F 9/542* (2013.01); *G06F 40/30* (2020.01);
(Continued)

(58) Field of Classification Search
CPC . G06F 8/311; G06F 8/71; G06F 9/542; G06F 8/60–66; G06F 8/73
(Continued)

(56) References Cited

U.S. PATENT DOCUMENTS

| 2007/0256050 A1* | 11/2007 | Behnia | G06F 8/71 717/104 |
|---|---|---|---|
| 2024/0069908 A1* | 2/2024 | Moraes | G06F 8/73 |
| 2024/0104479 A1* | 3/2024 | Bansal | G06F 8/71 |

OTHER PUBLICATIONS

Shimagaki, Junji, et al., A Study of the Quality-Impacting Practices of Modern Code Review at Sony Mobile, IEEE/ACM 38th IEEE International Conference on Software Engineering Companion, 2016, 10 pages, [retrieved on Sep. 9, 2024], Retrieved from the Internet: <URL:http://ieeexplore.ieee.org/>.*

(Continued)

*Primary Examiner* — Geoffrey R St Leger
(74) *Attorney, Agent, or Firm* — Honigman LLP; Matthew H. Szalach; Jonathan P. O'Brien

(57) ABSTRACT

An infrastructure system facilitates trace-based surveys to query users their experiences with pull request workflows. For example, the infrastructure system may receive from a client device associated with a user a pull request for making one or more changes to a programming code repository. The infrastructure system may generate a trace based on a pull request workflow including operations for making the change(s). The trace includes spans, each of which correspond to one or more operations in the pull request workflow. The infrastructure system generates log files, each log file includes data logged during the one or more operations of a span. The log files may be stored as a dataset of the trace. The infrastructure system may transmit a survey to the client device based on the dataset. The infrastructure system may also modify the pull request workflow based on the user's response to the survey.

18 Claims, 10 Drawing Sheets

(51) Int. Cl.
  *G06F 8/71* (2018.01)
  *G06F 40/30* (2020.01)
  *G06Q 10/0633* (2023.01)
  *G06Q 30/0203* (2023.01)

(52) U.S. Cl.
  CPC ..... *G06Q 10/0633* (2013.01); *G06Q 30/0203* (2013.01)

(58) Field of Classification Search
  USPC .................................................. 717/168–178
  See application file for complete search history.

(56) References Cited

OTHER PUBLICATIONS

Huq, Syed Fatiul, et al., Understanding the Effect of Developer Sentiment on Fix-Inducing Changes: An Exploratory Study on GitHub Pull Requests, 26th Asia-Pacific Software Engineering Conference (APSEC), 2019, 8 pages, [retrieved on Sep. 9, 2024], Retrieved from the Internet: < URL:http://ieeexplore.ieee.org/>.*

* cited by examiner

TRACE-BASED SURVEY FOR PULL REQUEST WORKFLOW

TECHNICAL FIELD OF THE DISCLOSURE

The present disclosure relates generally to infrastructure workflows and, more specifically, to trace-based surveys for infrastructure workflows.

BACKGROUND

An autonomous vehicle (AV) is a vehicle that is capable of sensing and navigating its environment with little or no user input. An AV may sense its environment using sensing devices such as Radio Detection and Ranging (RADAR), Light Detection and Ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to navigate the vehicle. As used herein, the phrase "AV" includes both fully autonomous and semi-autonomous vehicles. The operation of an AV may require various software applications. The execution and maintenance of the software applications may be facilitated by an infrastructure system. For instance, the infrastructure system can process pull requests from developers to update the code repositories of the applications.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
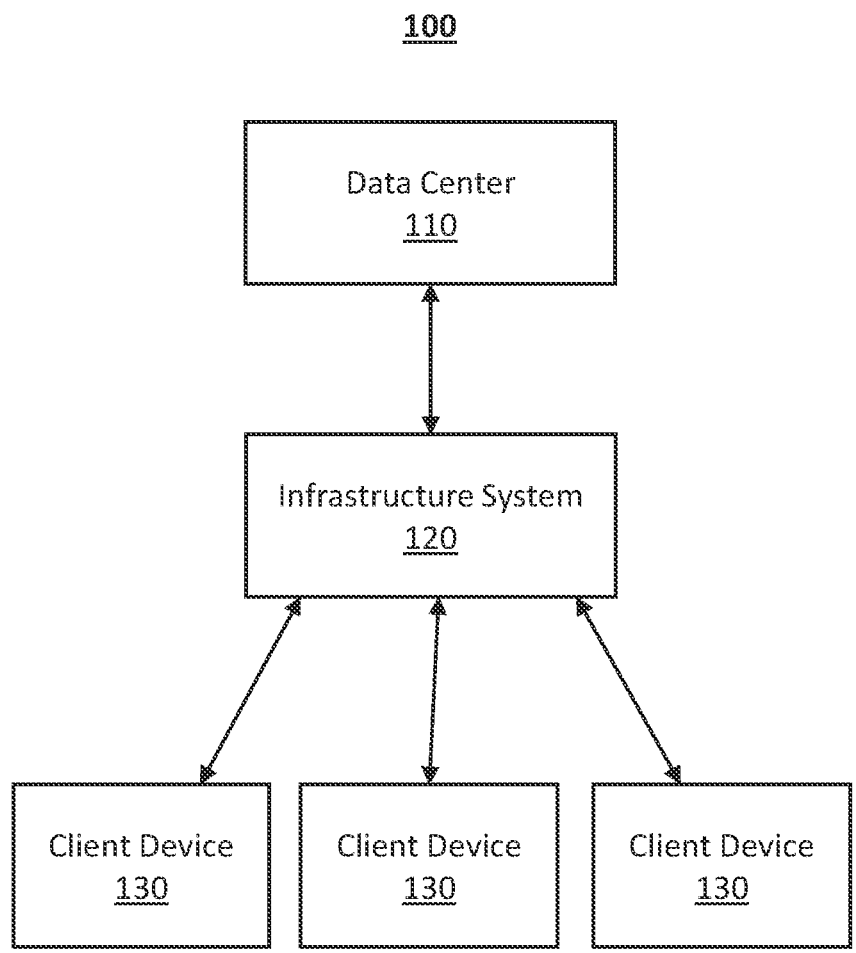
FIG. 1 illustrates an example AV application environment, according to some embodiments of the present disclosure.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

AVs can provide driverless ride services. A person can request an AV to pick him/her up from a location and drop him/her off at another location. With the autonomous driving features of the AV, the person does not have to drive during the ride and can be a passenger of the AV. The AV can navigate from the pick-up location to the drop-off location with no or little user input. AVs can provide other driverless services too, such as delivery service. A person can request an AV to deliver one or more items from one location to another location, and the person does not have to drive or be a passenger of the AV for the delivery.

Driverless operations of AVs are usually controlled by software applications (also referred to as "applications," "AV applications," or "AV software applications"). Development and maintenance of the applications often needs an infrastructure system, such as an infrastructure system that can facilitate pull requests to update the programming codes (also referred to as "codes") of the applications. Many infrastructure systems provide pull request workflows that can process pull requests. A pull request workflow may include a plurality of operations, such as decades, hundreds, or even more operations. To better support development and maintenance of the applications, it can be important to understand how well a pull request workflow performs and to determine whether and how the pull request workflow can be improved. For many infrastructure systems, surveys are sent to developers after the developers' pull requests are completed. The surveys include questions querying the users' experience with the pull request workflow. However, such surveys are typically sent to users a significant amount of time after their pull requests are completed. For instance, the surveys may be sent to developers based on a monthly, quarterly, or even yearly basis. Due to the delay, it can be hard for the developers to recall their experiences with the pull request workflow. Also, such surveys are usually generic and the developers usually receive the same survey. Therefore, these surveying methods fail to effectively evaluate qualities of pull request workflows. Improved technologies for evaluating qualities of pull request workflows are needed.

Embodiments of the present disclosure may improve on at least some of the challenges and issues described above by providing trace-based surveys to users of an infrastructure system for evaluating workflows used (e.g., executed) by the infrastructure system ("infrastructure workflows") to process user requests. A user request is a request from a user of the infrastructure system for developing, updating, or testing one or more applications, such as one or more AV software applications. The infrastructure system may use a workflow to fulfill the user request. The workflow may include one or more operations. Examples of the user request may include pull request, request for a development environment action, request for a test run experience, request for a tool for inspecting or debugging AV, other types of workflow requests, or some combination thereof. The infrastructure system may generate a trace that represents the process of completing the user request. One or more surveys may be triggered by critical events in the trace. Questions in the one or more surveys may be generated based on the trace. The user's response(s) to the surveys can be used to evaluate metrics (e.g., qualities) of the workflow or to improve the workflow. Hereinafter, pull request is used as an example of user request. However, embodiments of the present disclosure are not limited to pull requests and can be used for other types of user requests that the infrastructure system may receive, including the examples described above.

In various embodiments of the present disclosure, an infrastructure system generates a trace for a user request (e.g., a pull request) based on a workflow used by the infrastructure system (e.g., a pull request workflow) to fulfill the user request. The pull request may be a request of a user (e.g., a developer for one or more applications) to make one or more changes to a programming code repository (also referred to as "code repository"). The code repository may include codes for the one or more applications. The trace may represent the whole process of completing the pull request using the pull request workflow. The trace may include a plurality of spans, each of which may represent a unit of work in the whole process. Some or all of the spans may be arranged in a sequence. The pull request workflow may include a plurality of operations through which the pull request can be completed. Examples of the operations include pulling change, creating branch, committing change, pushing change, proposing change, reviewing change, testing change, merging branch, other operations, or some combination thereof. The infrastructure system may provide an identifier for a trace or span for identifying the trace or span, e.g., by filtering traces or spans. The infrastructure system can log data for each span, the data may constitute a log file of the span. One or more log files may constitute a dataset of the trace. In some embodiments, the trace may have a plurality of datasets that constitutes a database of the trace.

The infrastructure system can use a dataset of the trace to trigger generation and release of one or more surveys to query the user's sentiment(s) towards the pull request workflow. For example, the infrastructure system may generate a survey based on the dataset of the trace. In some embodiments, the infrastructure system may generate a survey based on a log file of a span. The infrastructure system may send the survey to the client device associated with the user for the user to respond. The generation or release of the survey may be triggered based on a critical event that the infrastructure system identifies based on the dataset of the trace. The critical event may be completion of the pull request, error that occurred in the trace, lack of an expected user action in the trace, other events, or some combination thereof.

The infrastructure system may receive the user's response to the survey and use the user's response to evaluate the quality of the pull request workflow. The infrastructure system may evaluate the quality of the pull request workflow based on the responses from multiple users to one or more surveys for the pull request workflow. The infrastructure system may also improve the pull request workflow based on the user response(s).

Different from some of the surveying methods described above, the infrastructure system in the present disclosure can use trace-based surveys to get user feedback on pull request workflows. The trace-based surveys can be timelier and more effective as a trace-based survey may be sent to the user during or shortly after the process of completing the user's pull request. The user can have a fresh memory of the experience using the pull request workflow. Also, the trace-based survey can be better targeted at a critical event or operation in the pull request workflow. Therefore, the infrastructure system can more effectively evaluate the quality of the pull request workflow or improve the pull request workflow.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example AV Application Environment

FIG. 1 illustrates an example AV application environment 100, according to some embodiments of the present disclosure. The AV application environment 100 may be an environment for executing or maintaining AV applications. An AV application may perform one or more functions of an AV (e.g., functions of the onboard computer 650 of the AV 610 in FIG. 6) or a system managing the AV (e.g., the fleet management system 620 in FIG. 6). As shown in FIG. 1, the AV application environment 100 includes a data center 110, an infrastructure system 120, and client devices 130 (individually referred to as "client device 130"). In alternative configurations, different and/or additional components may be included in the AV application environment 100. For example, the AV application environment 100 may include a system that can virtualize the data center, e.g., in a public Cloud. As another example, the AV application environment 100 may include more than one data center 110, more than one infrastructure system 120, or a different number of client devices 130. Further, functionality attributed to one component of the AV application environment 100 may be accomplished by a different system or device included in the AV application environment 100.

The data center 110 may provide computing resources for running AV applications. The data center 110 may be a space that includes computer systems and associated components, such as processors, memories, data transmission devices (e.g., network devices, etc.), power supply devices, or other devices that are needed for running AV applications. The data center 110 may have various types of processors, such as a central processing unit, graphics processing unit, and so on. The data center 110 may have various types of memories, such as cache memories, main memories, disk memories, and so on. The data center 110 may also provide different data transmission bandwidths. In some embodiments, the data center 110 includes one or more servers. The data center 110 may also include equipment other than computer components. For instance, the data center 110 may include air conditioning equipment for adjusting temperatures in the space. In addition to hardware components, the data center 110 may also include software or firmware components that facilitate the operations of the hardware components.

The infrastructure system 120 may receive codes for AV applications from the client devices 130 and support the execution of the AV applications. The infrastructure system 120 may provide a virtual operating system for an AV application to run the AV application. The virtual operation system may provide virtualized computing resources facilitated by the data center 110. In some embodiments, the infrastructure system 120 may generate a container for an application. The container may include packages of software codes that contain elements to run in various environments, e.g., a data center (e.g., the data center 110), a public Cloud (e.g., a public Cloud facilitated by the data center 110), a personal computing device, and so on.

The infrastructure system 120 can also process pull requests for making changes to code repositories of AV applications. A pull request may include a change to a feature in an AV application. The infrastructure system 120 may generate a trace for a pull request. The trace represents the process of completing the pull request based on a workflow. The workflow is also referred to as a pull request workflow. The trace may include spans representing operations in the workflow. The trace may have one or more datasets including data indicating events that occur in the trace and are logged by the infrastructure system 120. In some embodiments, the trace may have one or more datasets. The infrastructure system 120 may use a dataset of the trace to provide trace-based surveys to one or more users of the pull request workflow. A user of the pull request workflow may be a development engineer (also referred to as "developer") that works on developing or maintaining the AV application. The infrastructure system 120 may also use the users' response to the survey to evaluate the quality of the pull request workflow or modify the pull request workflow. Certain aspects of the infrastructure system 120 are described below in conjunction with FIG. 2.

A client device 130 may be a device capable of communicating with the infrastructure system 120, e.g., via one or more networks. The client device 130 can transmit data (e.g., code repository of application, new branch of a code repository, response to a survey, etc.) to the infrastructure system 120 and receive data (e.g., survey, feedback on new branch of a code repository, etc.) from the infrastructure system 120. The client device 130 can also receive user input and provide outputs. In some embodiments, outputs of the client devices 130 are in human-perceptible forms, such as text, graphics, audio, video, and so on. The client device 130 may include various output components, such as monitors, speakers, headphones, projectors, and so on. The client device 130 may be a desktop or a laptop computer, a smartphone, a mobile telephone, a personal digital assistant (PDA), or another suitable device.

In some embodiments, a client device 130 executes an application allowing a user 135 of the client device 130 to interact with the infrastructure system 120. For example, a client device 130 executes a pull request application to enable interaction between the client device 130 and the infrastructure system 120 for processing pull requests. In another embodiment, a client device 130 interacts with the fleet management system 620 through an application programming interface (API) running on a native operating system of the client device 130, such as IOS® or ANDROID™. The application may be provided and maintained by the infrastructure system 120. The infrastructure system 120 may also update the application and provide the update to the client device 130.

Communications between the data center 110, the infrastructure system 120, and the client devices 130 may be through one or more networks (not shown in FIG. 1). The networks may be local area networks, wide area networks, or a combination of both. The networks may use one or more wired communication systems, one or more wireless communication systems, or some combination thereof. In one embodiment, a network may use standard communications technologies and/or protocols, such as Ethernet, 802.11, worldwide interoperability for microwave access (WiMAX), 3G, 4G, 5G, code division multiple access (CDMA), digital subscriber line (DSL), and so on. Examples of networking protocols used for communicating via the network include multiprotocol label switching (MPLS), transmission control protocol/Internet protocol (TCP/IP), hypertext transport protocol (HTTP), simple mail transfer protocol (SMTP), file transfer protocol (FTP), and so on.

Example Infrastructure System

Figure 2:
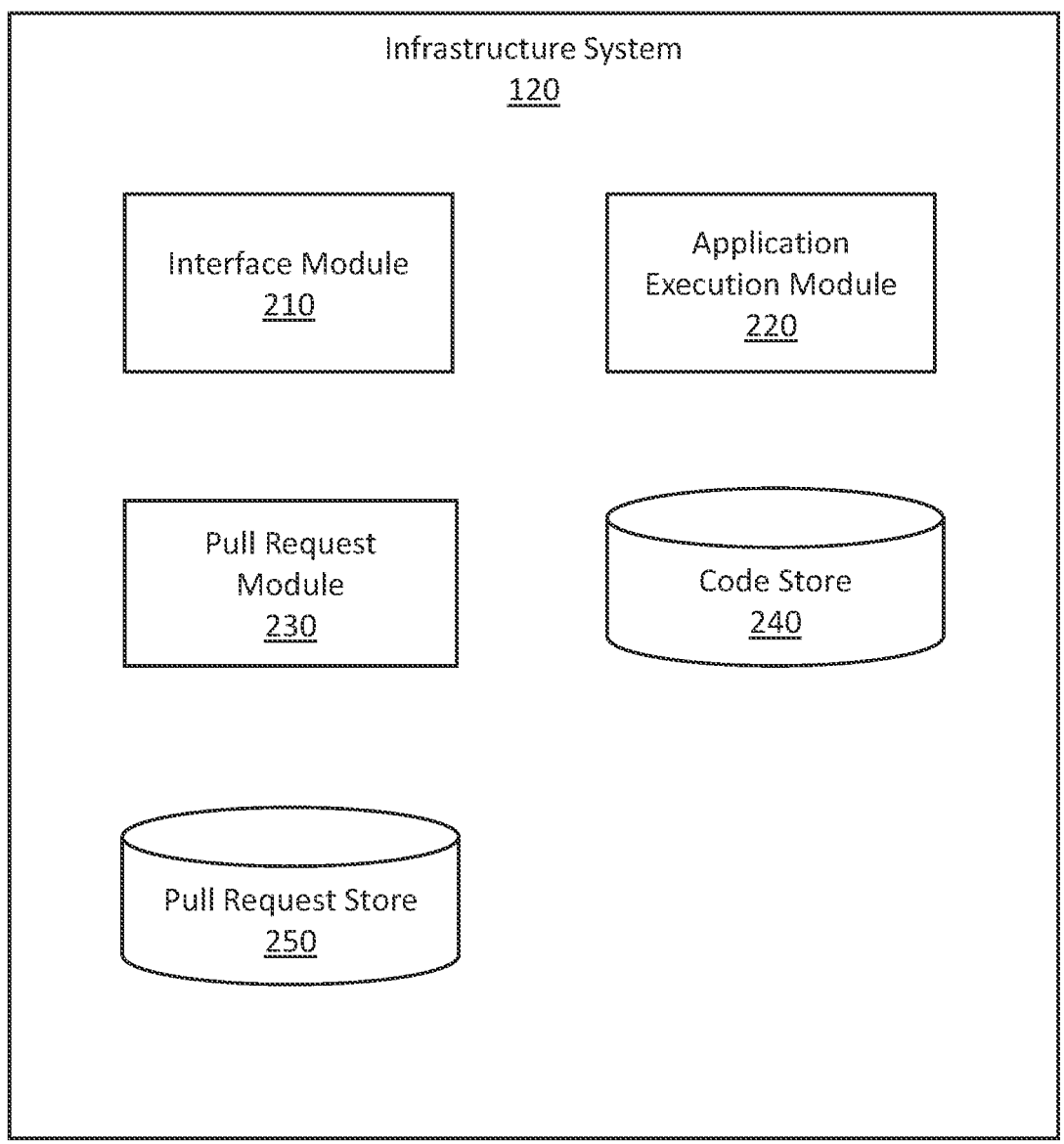
FIG. 2 is a block diagram showing an infrastructure system, according to some embodiments of the present disclosure.

FIG. 2 is a block diagram showing the infrastructure system 120, according to some embodiments of the present disclosure. The infrastructure system 120 may trace operations in a pull request workflow used to process a pull request. The infrastructure system 120 includes an interface module 210, an application execution module 220, a pull request module 230, a code store 240, and a pull request store 250. In alternative configurations, different and/or additional components may be included in the infrastructure system 120. For instance, the code store 240 and the pull request store 250 may be a single store in some embodiments. Further, functionality attributed to one component of the infrastructure system 120 may be accomplished by a different component included in the infrastructure system 120 or a different system.

The interface module 210 may receive information of applications, e.g., from the client devices 130. In some embodiments, the information of an application may include programming codes of the application. The programming codes may be source codes that can be compiled to generate object codes. Additionally or alternatively, the information of the application may include other information associated with the application, such as software version, configuration, instruction for compiling the source codes, instruction for deploying the application, instruction for generating a container for virtually running the application (e.g., running the application in a Cloud), and so on. The information of the application may also include a file (e.g., a declarative file) that describes a purpose of the application, a function of the application, and so on. The interface module 210 may store the information of applications in the code store 240 as one or more programming code repositories. In some embodiments, a programming code repository may include programming codes for a single application. In other embodiments, a programming code repository may include programming codes for multiple applications.

The interface module 210 may also receive pull requests, e.g., from the client devices 130. A pull request is a request to make one or more changes in a programming code repository. The programming code repository may be referred to as the target repository. The pull request may be a proposed feature of the corresponding application(s). The purpose of the one or more changes may be to add a new feature into an application, modify a feature in an application, remove a feature in an application, and so on. The pull request may be reviewed or modified before it is merged into the target repository and becomes a portion of the target repository. The interface module 210 may store the pull requests in the pull request store 250. A pull request may be from a user associated with a client device 130. For instance, the pull request may be initiated, released, or filed by the user. The user of the pull request may be the user who provided the source codes in the target repository or a different user. More details about pull requests are described below in conjunction with the pull request module 230.

In some embodiments, the interface module 210 may facilitate sending surveys to client devices associated with users of the infrastructure system 120, e.g., the client devices 130. The interface module 210 may receive the surveys from the pull request module 230. The interface module 210 may also facilitate receiving user responses to surveys from client devices associated with users of the infrastructure system 120, e.g., the client devices 130. The interface module 210 may provide the user responses to the pull request module 230.

The application execution module 220 facilitates execution of applications based on programming codes stored in the code store 240. In some embodiments, the application execution module 220 includes a compiler that can convert source codes to object codes that can be executed by one or more processors. The application execution module 220 may determine computing resources that are needed to execute an application. For instance, the application execution module 220 may determine the type(s) of processor (e.g., CPU, GPU, etc.), the number of processors, the type(s) of memory (e.g., cache memory, main memory, disk storage, etc.), the number of memories, memory storage size, data transmission bandwidth, and so on. The application execution module 220 may allocate a task of running the application to one or more servers based on the determined computing resources.

In some embodiments, the application execution module 220 may facilitate execution of an application in various environments, including virtual environments. For instance, the application execution module 220 may generate a container based on a programming code repository. The container may include packages of software codes that contain elements to run in various environments, e.g., a private data center, a public Cloud, a personal computing device, and so on. The container may virtualize an operation system that runs the one or more applications associated with the programming code repository. The container can provide a logical packaging mechanism that virtualizes processor, memory, network resource, or other computing resources at the operating system level. Container-based applications can be decoupled from the environment in which they run. The decoupling can allow container-based applications to be deployed consistently regardless of whether the target environment is a private data center, the public Cloud, or even a personal computer.

The pull request module 230 facilitates one or more pull request workflows that process pull requests. A pull request workflow may include a sequence of operations for processing pull requests. Example operations may include creating new branch, pushing change, opening pull request, receiving feedback, responding to feedback, testing, merging new branch, other operations, or some combination thereof. A pull request may go through a number of operations before it is completed. The pull request module 230 may monitor the operations to evaluate the performance of the pull request workflow in processing pull requests.

In some embodiments, the pull request module 230 monitors the operations based on distributed tracing. For instance, the pull request module 230 may generate a trace for each pull request and use the trace to monitor the operations in the pull request workflow. The trace may represent the whole process for a pull request and includes spans that represent logical units in the process. A span may represent one or more operations in the pull request workflow. The pull request module 230 may log data for each span in a trace. A span may be associated with data indicating one or more events that occurred during the one or more operations represented by the span. The logged data for a span may be a log file, and the log files of all the spans in a trace may constitute one or more datasets of the trace. The pull request module 230 may store datasets of traces in the pull request store 250.

The pull request module 230 may use the dataset of the trace to evaluate the performance of the pull request workflow. The pull request module 230 may also use the dataset of the trace for providing trace-based surveys to one or more users of the pull request workflow to query the users' experiences of using the pull request workflow. For instance, the pull request module 230 may use the dataset of the trace to determine whether to send out a survey. Additionally or alternatively, the pull request module 230 may use the dataset of the trace to generate one or more questions in a survey. The pull request module 230 may provide surveys further based on one or more attributes of the user. The pull request module 230 can evaluate the quality of a pull request workflow based on user responses to one or more surveys associated with the pull request workflow. In some embodiments, the pull request module 230 can modify the pull request workflow based on the user responses. Certain aspects of the pull request module 230 are described below in conjunction with FIG. 3.

Example Pull Request Module

Figure 3:
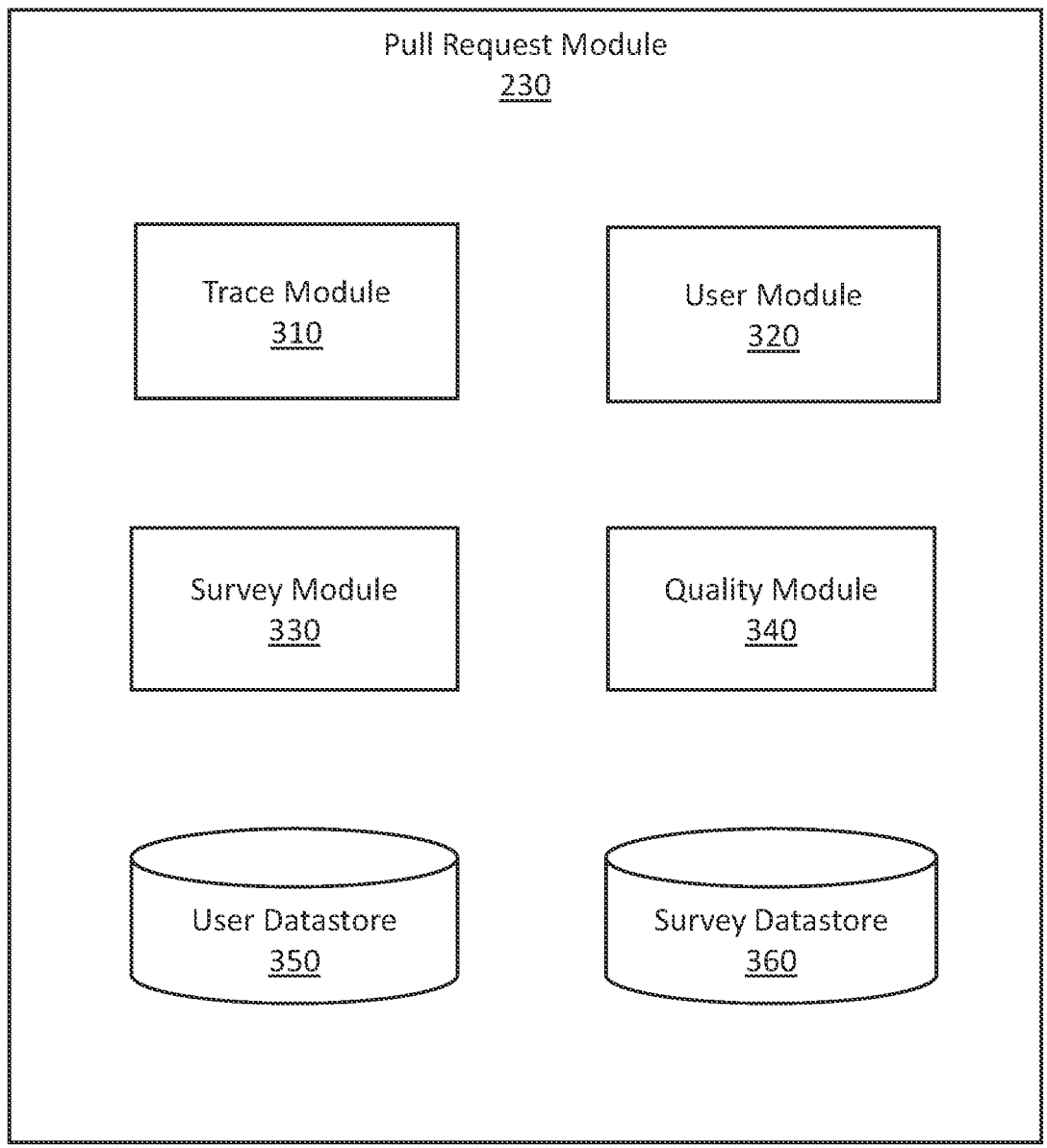
FIG. 3 is a block diagram showing a pull request module, according to some embodiments of the present disclosure.

FIG. 3 is a block diagram showing a pull request module 230, according to some embodiments of the present disclosure. The pull request module 230 may trace operations in a pull request workflow used to process a pull request. The pull request module 230 includes a trace module 310, a user module 320, a survey module 330, a quality module 340, a user datastore 350, and a survey datastore 360. In alternative configurations, different and/or additional components may be included in the pull request module 230. Further, functionality attributed to one component of the pull request module 230 may be accomplished by a different component included in the pull request module 230 or a different module.

The trace module 310 generates traces for pull requests based on the pull request workflows used to process the pull requests. A trace may include a plurality of spans. The trace may represent the whole process for completing a pull request (e.g., from initiation to competition), and a span may represent a logical unit of work in the trace. The spans may be arranged in a sequence. The completion of a span may be a prerequisite of the start of the next span. Each span in the trace may be a time interval in the trace. In some embodiments, a span may correspond to a single operation in the pull request workflow. In other embodiments, a span may correspond to multiple operations in the pull request workflow. In some embodiments, the duration of a span (e.g., from a starting time of the span to an ending time of the span) may be different from the duration of a different span. There may be one or more hierarchy relationships between the spans. For instance, a span may be a parent span or root span that has one or more child spans. A child span may be triggered by the parent span. For instance, the completion (or failure) of an operation captured by the parent span may trigger an operation captured by the child span. In some embodiments, the one or more child spans may be temporally subsequent to the parent span.

The trace module 310 may generate a log file for each span in a trace. The log file may include data indicating one or more events associated with the span. An event may be the start of the span, an error detected during the span, successful completion of the span, and so on. The trace module 310 may store all the log files of all the spans in the trace as a single dataset of the trace. The trace module 310 may store datasets of traces in the pull request store 250.

In some embodiments, the trace module 310 may generate metadata for the trace, each span in the trace, or both. For instance, the trace module 310 may provide an identifier of a trace ("trace ID"), which can be used to identify the trace, the dataset of the trace, or both. The identifier may include one or more numbers, one or more symbols, one or more letters, or some combination thereof. The trace ID may also be used for identifying the spans in the trace. For instance, each span may have a span ID that includes the trace ID. A trace ID may also be referred to as a trace tag. A span ID may also be referred to as a span tag. The trace module 310 can use trace ID or span ID to query and filter traces or spans. The trace module 310 may retrieve a dataset of a trace based on the corresponding trace ID or retrieve a log file of a span based on the corresponding span ID.

Other metadata of a span may include duration (i.e., duration of time of the span), start time, end time, information indicating a service associated with the span, information indicating the operation represented by the span, identifier of the span's parent span, identifier of the spans' child span, other types of metadata, or some combination thereof.

The user module 320 populates the user datastore 350 with information about users of the infrastructure system 120. Information about users may include user actions. For instance, the user module 320 may track user actions on the infrastructure system 120. Examples of user actions include communications users made on the infrastructure system 120 (e.g., communications of a user with another user, communication of a user with an agent of the infrastructure system 120, etc.), user actions associated with pull requests (e.g., making pull requests, responding to feedbacks, commenting on pull request workflows, etc.), user actions associated with surveys (e.g., answer surveys, rejecting surveys, commenting on surveys, etc.). In some embodiments, information of a user is stored in a user profile for the user in the user datastore 350.

In some embodiments, the user module 320 may predict an action of a user. For instance, the user module 320 may include one or more prediction modules (not shown in FIG. 3) to predict user actions based on user data in the user datastore 350. For example, a prediction module may learn a pattern of how a user interacts with the infrastructure system 120 and predict an action that is likely to be taken by the user based on the pattern. For example, the prediction module may learn that the user makes a pull request at a predetermined frequency, e.g., by using a model trained with machine learning techniques. The prediction module can then predict the time when the user will make the next pull request with the infrastructure system 120. As other examples, the user module 320 may predict the time when a user would respond to feedback for a pull request, the time when a user would respond to a survey, and so on.

The survey module 330 may provide trace-based surveys to users of pull request workflows. The survey module 330 may determine whether to send out a survey associated with a pull request based on the dataset of the trace for the pull request. The survey module 330 may retrieve the dataset of the trace from the pull request store 250 based on the trace ID. The survey module 330 may send out a survey before, during, or after the trace. In some embodiments, the survey module 330 determines whether a critical event has occurred based on the dataset of the trace. Examples of the critical event may include completion of the trace, lack of user response to feedback within a predetermined amount of time after the feedback was provided to the user, failure of the completion of an operation within a predetermined amount of time, error detected during the trace, detection of a user sentiment (e.g., a negative sentiment of a user towards the pull request process), and so on. In response to determining that the critical event has occurred, the survey module 330 may determine to provide a survey to the user who made the pull request.

The survey may include one or more questions querying the user's sentiment towards at least part of the pull request workflow. An example question may ask for a rating of the user on the pull request workflow, an operation in the pull request workflow, a feature of the pull request workflow, and so on. Another example question may ask for the user's comment on the pull request workflow, an operation in the pull request workflow, a feature of the pull request workflow, and so on. Yet another example question may ask for the user's opinion with respect to how to improve the pull request workflow, an operation in the pull request workflow, a feature of the pull request workflow, and so on. The survey may include other types of questions.

In some embodiments, the survey module 330 may retrieve the survey from the survey datastore 360. The survey datastore 360 may include a plurality of pre-generated surveys. The survey module 330 may select the survey from the pre-generated surveys based on the critical event that triggers the survey. For instance, for the completion of the trace, the survey module 330 may select the survey that queries users their experience with the whole trace, while for the completion of a span, the survey module 330 may select the survey that queries users their experience with the span or the span and one or more related spans. Additionally or alternatively, the survey module 330 may select the survey based on other factors, e.g., the pull request, the pull request workflow, one or more attributes of the user, the type of application or programming code repository associated with the pull request, other factors, or some combination thereof.

In other embodiments, the survey datastore 360 may modify a pre-generated survey or generate a new survey based on the critical event that triggers the survey, the pull request, the pull request workflow, one or more attributes of the user, the type of application or programming code repository associated with the pull request, other factors, or some combination thereof. The modified survey or new survey can be stored in the survey datastore 360.

The survey module 330 may also provide surveys based on user data, such as user profiles stored in the user datastore 350, predictions made by the user module 320, and so on. In an example, the survey module 330 may provide a survey to a user based on a determination that a user action, which the user module 320 predicts to be made by the user by a particular time, is not received by the pull request module 230 by the particular time. The survey may query the user the reason for the lack of the user action.

The quality module 340 evaluates quality of pull request workflows based on user responses to surveys provided by the survey module 330. The quality module 340 may determine a quality score that indicates the quality of a pull request workflow based on user response to one or more surveys associated with the pull request workflow. Each of the one or more surveys may be triggered based on a dataset of a trace of the pull request workflow. In some embodiments, the quality module 340 may receive responses from multiple users. The quality module 340 may determine an individual quality score based on the response from an individual user and aggregates the individual quality scores of all the users to determine the quality score of the pull request workflow.

In some embodiments, in addition to or in lieu of a quality score of the pull request workflow, the quality module 340 may also evaluate the quality of one or more operations in the pull request workflow. The quality module 340 may determine a quality score for each operation. In embodiments where responses from multiple users to one or more surveys associated with an operation were received, the quality module 340 may determine an individual quality score based on the response from an individual user and aggregates the individual quality scores of all the users to determine the quality score of the operation.

The aggregation of individual quality scores for determining the quality score of either a pull request workflow or an operation may be weighted. For instance, the quality module 340 may determine weights of the users based on user data. The quality score may be a weighted aggregation of the individual quality scores. For instance, the quality module 340 may compute a weighted individual quality score for each user, e.g., by multiplying the weight with the individual quality score of the user, and determine a sum of all the weighted individual quality scores.

In some embodiments, the quality module 340 may generate a quality heatmap for a pull request workflow based on user responses to surveys associated with the pull request workflow. The quality heatmap may include elements that represent operations in the pull request operations. An element may be a shape. Different operations may be represented by shapes having different sizes or locations in the quality heatmap. The quality module 340 may receive a plurality of evaluations on the quality of a pull request workflow from one or more users. The quality module 340 may generate elements that represent the evaluations. The quality module 340 may also associate each of the evaluations with one or more operations in the pull request workflow. For instance, the quality module 340 may analyze the language in the user response to determine which operation(s) the user evaluated in the user response. The quality module 340 may further associate the element representing an evaluation with the element(s) representing the one or more operations. For instance, the quality module 340 may place the element representing the evaluation over the element(s) representing the one or more operations. The quality heatmap can therefore illustrate the quality of the one or more operations that is determined based on the user's evaluation of the one or more operations.

The quality module 340 may also determine whether to modify one or more operations in a pull request workflow based on quality scores or quality heatmap. In some embodiments (e.g., embodiments where the quality module 340 determines quality scores for operations in the pull request workflow), the quality module 340 may determine to modify the codes of an operation based on that the quality score of the operation is below a threshold or that the quality score of the operation is ranked lower than one or more other operations. In other embodiments (e.g., embodiments where the quality module 340 generates a quality heatmap for the pull request workflow), the quality module 340 may determine to modify an operation based on the quality heatmap. For instance, the quality module 340 may determine to modify the codes of an operation, the element of which overlays with more than a threshold number of elements representing negative evaluations.

The user datastore 350 stores data associated with users of the infrastructure system 120. In some embodiments, each user of the infrastructure system 120 is associated with a user profile, which is stored in the user datastore 350. A user profile includes declarative information about the user that was explicitly shared by the user and may also include profile information inferred by the infrastructure system 120, e.g., by the user module 320. In one embodiment, a user profile includes multiple data fields, each describing one or more attributes of the corresponding user. Examples of information stored in a user profile include information identifying the user (e.g., names, work ID, etc.), contact information of the user (e.g., email address, phone number, fax number, etc.), information describing application(s) associated with the user (e.g., applications designed or maintained by the user, etc.), information describing a group that the user belongs (e.g., a group, team, business unit, department, etc.), and so on. While user profiles in the user profile store 205 are frequently associated with individuals, user profiles may also be stored for entities, such as groups, teams, departments, business units, organizations, and so on. This allows an entity to interact with the infrastructure system 120, e.g., for running applications, making pull requests, and so on.

The user datastore 350 may also store historical data of users. For instance, the user datastore 350 stores information associated with historical pull requests made by users, communications of users with the infrastructure system 120, surveys provided to users, user responses to surveys, and so on.

The survey datastore 360 stores surveys generated by the survey module 330. The survey datastore 360 may also store user responses to the surveys. In some embodiments, the survey datastore 360 may store data generated by the quality module 340 based on user responses to surveys, such as user sentiments or user evaluations on pull request workflow or operations determined by the quality module 340, quality scores, quality heatmaps, and so on. In some embodiments, the user datastore 350 and the survey datastore 360 may be a single datastore.

Example Pull Request Workflow

Figure 4:
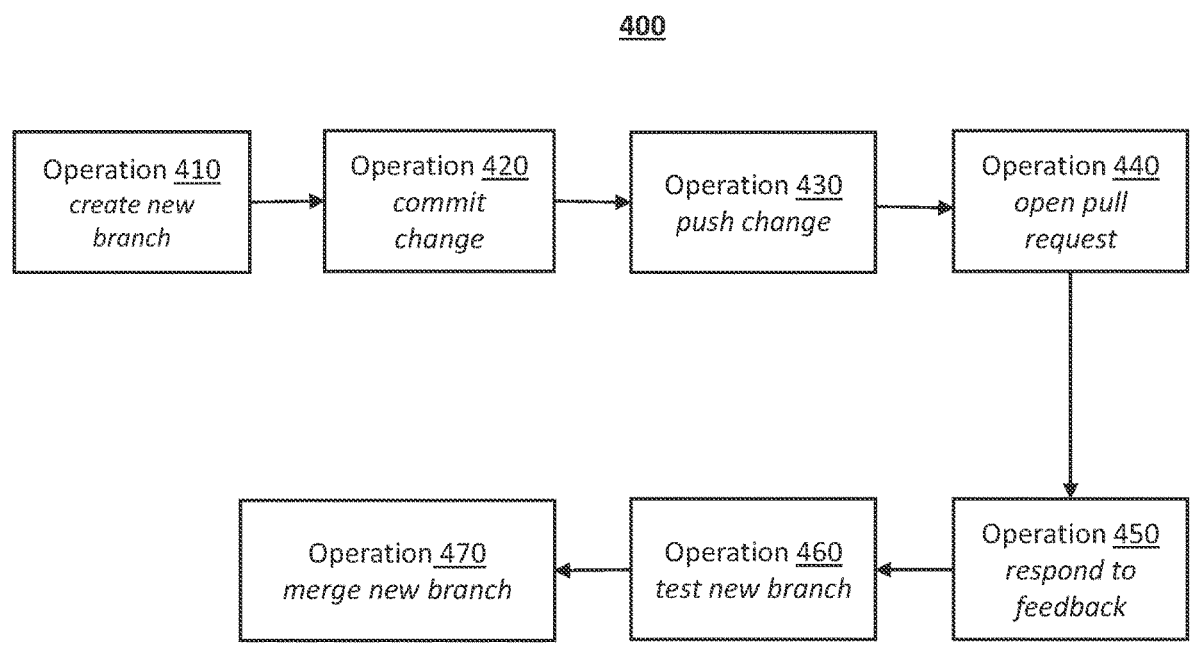
FIG. 4 illustrates an example pull request workflow for which trace-based surveys can be provided to users of the pull request workflow, according to some embodiments of the present disclosure.

FIG. 4 illustrates an example pull request workflow 400 for which trace-based surveys can be provided to users of the pull request workflow, according to some embodiments of the present disclosure. The pull request workflow 400 may be a workflow provided by the pull request module 230. The pull request workflow 400 may be used for making changes to code repositories of AV applications. The pull request workflow 400 includes seven operations: 410, 420, 430, 440, 450, 460, and 470. The operations are arranged in a sequence. An operation may be triggered by the completion of the preceding operation in the sequence. In other embodiments, the pull request workflow 400 may include fewer, more, or different operations. Also, the operations may have different relationships. For the purpose of simplicity and illustration, the pull request workflow 400 in the embodiments of FIG. 4 is used to add a feature to an AV application. In other embodiments, the pull request workflow 400 can be used to process other pull requests, such as modifying features in AV applications, removing features from AV applications, and so on.

The operation 410 is for creating a new branch. The operation 410 may be performed at a local computer, such as a client device 130 associated with a user of the pull request module 230. In some embodiments, the user may create the new branch using an application running on the client device 130. The application may be provided and maintained by the pull request module 230. The new branch represents a new version of the AV application that includes the new feature. The new branch has a different code repository from the current code repository of the AV application, i.e., the code repository of the current version of the AV application that does not include the new feature. The current code repository of the AV application may be referred to as the master branch. At this stage, the master branch may be deployable, but the new branch is not deployable. In some embodiments, the master branch is remote (i.e., available to others, such as people having access to the infrastructure system 120 and the data center 110) versus the new branch is local (i.e., not be available to others than the user).The new branch may be created off the master branch. The new branch may have a name that describes the new feature.

The operation 420 is for committing change. The operation 420 is to add commits to keep track of the progress of completing the pull request. Commits may create a history of the work to indicate what has been done. In some embodiments, each commit may be a version of the new branch. A commit may be generated by making one or more changes to a previous commit. A commit may be associated with a message that explains why the changes were made. In some embodiments, each commit may be a separate unit of change. This can facilitate the user to reverse changes.

The operation 430 is for pushing change. In this operation, the new branch may be pushed and become available to others, such as reviewers who will review the commits. In some embodiments (such as embodiments where the new branch is local in the operation 410), the new branch may become remote through the operation 430.

The operation 440 is for opening the pull request. The user may trigger the opening of the pull request. Opening the pull request can initiate review of the commits by reviewers. The reviewers may approve or reject at least one of the commits. Additionally or alternatively, the reviewers may provide feedback, such as questions or comments, on the commits. Even though multiple reviewers are referred to, the commits may be reviewed by a single reviewer.

The operation 450 is for responding to feedback. The user may discuss the feedback or commits with the reviewers. In some embodiments, the user may modify codes in the commits based on the reviewers' feedback. For instance, a comment may indicate that there is a bug in the code, the user can fix the bug in the new branch. The user may also push the change to the new branch. The operation 450 may complete after the reviewers approve the new branch.

The operation 460 is for testing the new branch. A test may be performed on the version of the new branch that is approved by the reviewers to check whether the new branch still has the feature that the user intends to make. After the test, the user may rebase the new branch on the master branch to test all changes together. For instance, changes committed on the master branch may be replayed on the new branch. In some embodiments, the operation 460 includes resetting the new branch to the same commit as the master branch and applying each commit of the new branch. Issues (e.g., bugs, etc.) may be identified in the operation 460. The issues may be addressed before the operation 470 starts.

The operation 470 is for merging the new branch. In some embodiments, it is considered that the new feature has been verified in production before the operation 470 starts. In operation 470, the new branch is merged with the master branch and becomes a new version of the master branch, which can be deployed.

Even though the operation 470 is the last operation in FIG. 4, the pull request workflow 400 may have another operation for creating a tag for the new version of the master branch after the merge. The tag may indicate the new version and distinguish it from previous versions. The tag may include other information, e.g., a timestamp of the merge, a description of the new feature, and so on.

The pull request workflow 400 may be used to generate a trace for a particular pull request. The trace may include seven spans, each of which corresponding to one of the operations in the pull request workflow 400. For instance, the trace may include a span for creating new branch, a span for committing change, a span for pushing change, a span for opening pull request, a span for responding to feedback, a span for testing new branch, and a span for merging new branch. The spans may be in a sequence. The start of a span may be triggered by the immediately preceding span, which may be a child of the span.

Example Quality Heatmap

Figure 5:
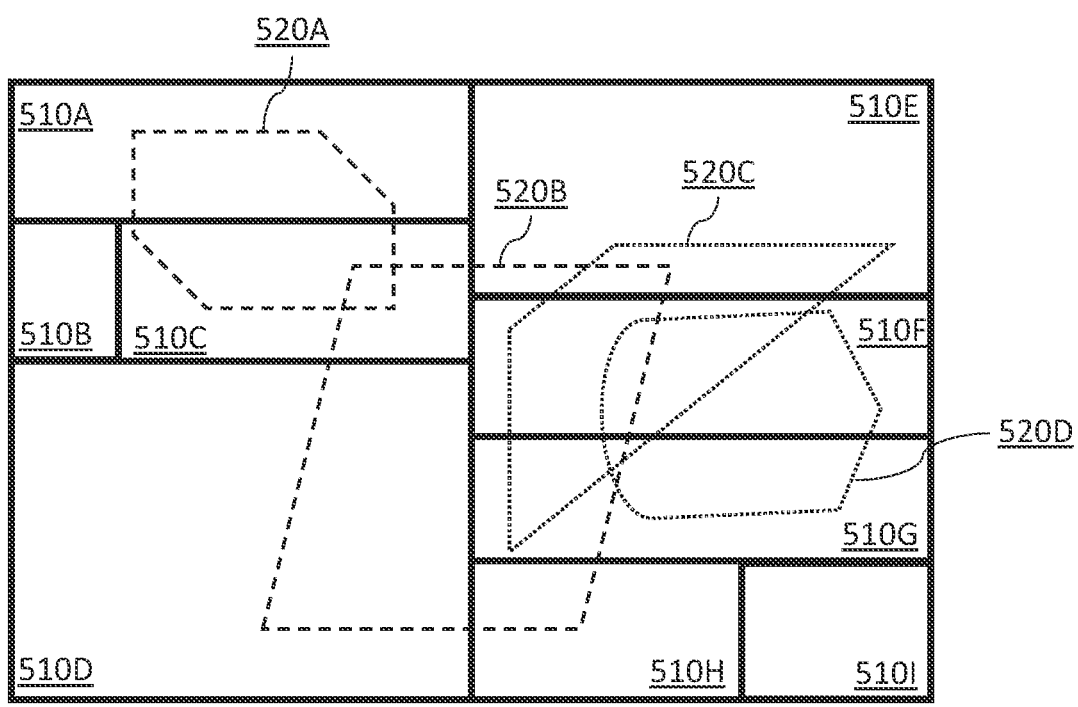
FIG. 5 illustrates an example quality heatmap of a pull request workflow, according to some embodiments of the present disclosure.

FIG. 5 illustrates an example quality heatmap 500 of a pull request workflow, according to some embodiments of the present disclosure. The quality heatmap 500 includes nine elements 510A-510I (collectively referred to as "elements 510" or "element 510"), which are illustrated with rectangles of solid lines. Each element 510 represents a portion of the pull request workflow, such as a logical unit (e.g., an operation) in the pull request workflow. The positions of the elements 510 in the quality heatmap 500 may indicate relationships among the operations. For instance, the operation represented by the element 510A may be performed before the operations represented by the elements 510B and 510C. A span of the operation represented by the element 510A may be a parent of the spans of the operations represented by the elements 510B and 510C. The different sizes of the elements may indicate different amounts of computing resources needed for running the operations or different complexities of the operations. In other embodiments, the quality heatmap 500 may include fewer, more, or different elements. The elements may be arranged differently.

The quality heatmap 500 also includes elements 520A-520D (collectively referred to as "elements 520" or "element 520"), which are represented by shapes with broken lines. Each element 520 may represent an evaluation of a user on the pull request workflow. An element 520 may be generated based on the analysis of the user's response to a trace-based survey for the pull request workflow. The survey may be generated based on a trace for a pull request from the user that is processed through the pull request workflow. The survey may be provided to a user The four elements 520 may be generated based on user responses to four surveys.

In some embodiments, the user's sentiment towards the pull request workflow may be determined based on the user's response to the survey and the user's sentiment can be illustrated in the quality heatmap 500. As shown in FIG. 5, the elements 520A and 520B are represented by shapes with dash lines, indicating negative user sentiment, versus the element 520C and 520D are represented by shapes with dotted lines, indicating positive user sentiment.

The size, shape, and location of each element 520 may be determined based on a determination of which portions of the pull request workflow the user has commented on in the user's response to the survey. For instance, the pull request module 230 may perform a natural language analysis on the user's response to the survey and identify one or more portions of the pull request workflow that the user comments on in the user response. In some embodiments, the pull request module 230 may identify one or more features in the pull request workflow that the user comments on in the user response. The pull request module 230 may further determine the size, shape, and location of the element based on the identification. As illustrated in FIG. 5, the element 520A represents a negative user sentiment towards features in the operations represented by the elements 510A-510C, the element 520B represents a negative user sentiment towards features in the operations represented by the elements 510C-510H, the element 520C represents a negative user sentiment towards features in the operations represented by the elements 510E-510G, and the element 520D represents a positive user sentiment towards features in the operations represented by the elements 510F and 510G.

The sizes, shapes, and colors of the elements 510 and 520 in FIG. 5 are used for the purpose of illustration. Elements of different sizes, shapes, or colors may be used in the quality heatmap 500. Also, the quality heatmap 500 may include different types of elements that are not shown in FIG. 5. For instance, the quality heatmap 500 may include one or more interactive elements that allow users to interact with the quality heatmap 500. In some embodiments, the quality heatmap 500 may be dynamic. The quality heatmap 500 may be updated automatically by the pull request module 230. For instance, the pull request module 230 may update the quality heatmap 500 after new user feedback on the pull request workflow is received or after the pull request module 230 modifies the pull request workflow.

The pull request module 230 may evaluate the quality of the features (or operations) in the pull request workflow based on the quality heatmap 500. For instance, the quality heatmap 500 shows that the operation represented by the element 510C receives two user responses with negative sentiment. The pull request module 230 may determine that the operation has a low quality. The pull request module 230 may also modify the code for the operation to improve the quality of the pull request workflow, e.g., based on the negative user responses.

Example System Including AVs

Figure 6:
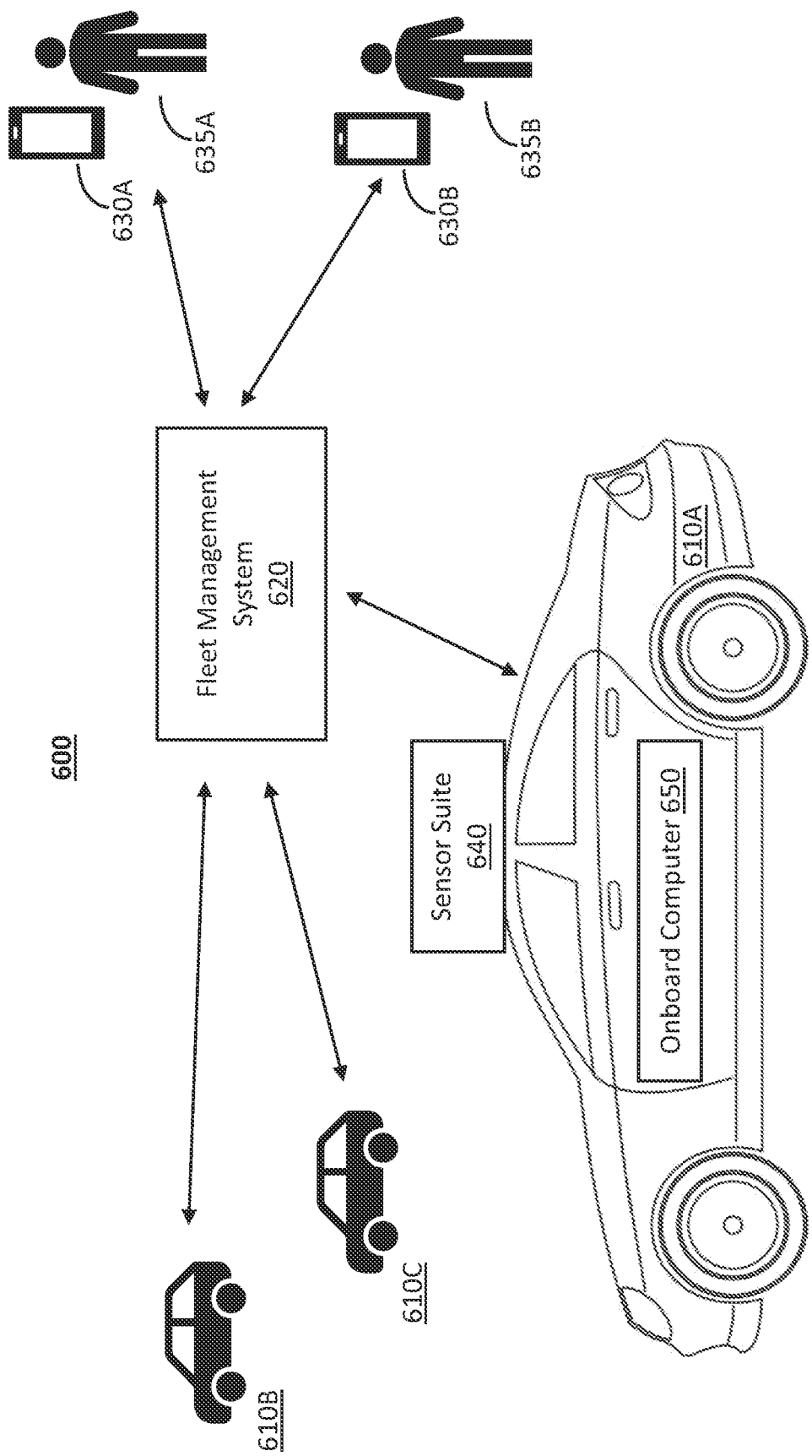
FIG. 6 illustrates a system including a fleet of AVs that can provide services to users, according to some embodiments of the present disclosure.

FIG. 6 illustrates a system 600 including a fleet of AVs that can provide services to users, according to some embodiments of the present disclosure. The system 600 includes AVs 610A-610C (collectively referred to as "AVs 610" or "AV 610"), a fleet management system 620, and client devices 630A and 630B (collectively referred to as "client devices 630" or "client device 630"). The client devices 630A and 630B are associated with users 635A and 635B, respectively. The AV 610A includes a sensor suite 640 and an onboard computer 650. Even though not shown in FIG. 6, the AV 610B or 610C can also include a sensor suite 640 and an onboard computer 650. In other embodiments, the system 600 may include more, fewer, or different components. For example, the fleet of AVs 610 may include a different number of AVs 610 or a different number of client devices 630.

The fleet management system 620 manages the fleet of AVs 610. The fleet management system 620 may manage operations of the AVs 610. In some embodiments, the fleet management system 620 may manage one or more services that the fleet of AVs 610 provides to the users 635. An example service is a ride service, e.g., an AV 610 provides a ride to a user 635 from a first location to a second location. Another example service is a delivery service, e.g., an AV 610 delivers one or more items from or to the user 635. The fleet management system 620 can select one or more AVs 610 (e.g., AV 610A) to perform a particular service, and instructs the selected AV to drive to one or more particular locations associated with the service (e.g., a first address to pick up user 635A, and a second address to pick up user 635B). The fleet management system 620 also manages fleet maintenance tasks, such as fueling, inspecting, and servicing of the AVs. As shown in FIG. 6, the AVs 610 communicate with the fleet management system 620. The AVs 610 and fleet management system 620 may connect over a network, such as the Internet. In some embodiments, the fleet management system 620 may receive service requests for the AVs 610 from the client devices 630. In an example, the user 635A may access an app executing on the client device 630A and requests a ride from a pickup location (e.g., the current location of the client device 630A) to a destination location. The client device 630A may transmit the ride request to the fleet management system 620. The fleet management system 620 may select an AV 610 from the fleet of AVs 610 and dispatches the selected AV 610 to the pickup location to carry out the ride request. In some embodiments, the ride request may further include a number of passengers in the group. In some embodiments, the ride request may indicate whether a user 635 is interested in a shared ride with another user traveling in the same direction or along the same portion of a route. The ride request, or settings previously entered by the user 635, may further indicate whether the user 635 is interested in interaction with another passenger.

The fleet management system 620 may provide an operational plan to an AV 610 for a service task assigned to the AV 610. The operational plan may include information about the service, such as one or more locations associated with the service (e.g., pickup location, drop-off location, etc.), one or more timestamps associated with the service (e.g., pickup time, drop-off time, etc.), information about the user who requested the service (e.g., identification information, user location, user profile, etc.), and so on. The operational plan may also include information about an environment in which the AV 610 will operate to provide the service. The environment may be a real-world region, area, or scene. For instance, the operational plan may include information about one or more conditions in the environment ("environmental conditions"). Examples of environmental conditions include weather condition (e.g., rain, snow, wind, etc.), road condition (e.g., road closures, water accumulation, road grade indicating a rate of change of the road elevation, etc.), traffic condition (e.g., traffic congestion, accidents, etc.), other types of environmental conditions, or some combination thereof. In some embodiments, the operational plan may be an ODD.

The operational plan includes one or more limitations on the operation of the AV 610 for providing the service. Example limitations include limitation on an attribute of the AV 610, limitation on a movement of the AV 610, limitation on an environment where the AV 610 performs at least part of the operation, limitation on a time when the AV 610 performs at least part of the operation, other types of limitations, or some combination thereof. The AV 610 can plan and control its behaviors during the operation based on the limitations.

In some embodiments, the operational plan is pre-defined, and the fleet management system 620 may generate the operational plan before the AV 610 operates to perform the service task. The fleet management system 620 may generate the operational plan based on information that is obtained by the fleet management system 620 before the operation of the AV 610. The information may be data received by the fleet management system 620 from the AV 610 or one or more other AVs 610, such as sensor data collected by the sensor suite 640 of each AV 610 during a historical operation. The historical operation may be in the same environment (e.g., same city, region, block, etc.) as the operation to be performed by the AV 610. Additionally or alternatively, the historical operation may be performed to provide the same type of service or to provide service to the same user (or the same group of users). The information may also include data received from third-party systems, such as systems that provide maps, weather predictions, road information, traffic information, and so on. The information may also include traffic rules, such as speed limit, requirement of yielding to pedestrians, and so on.

The fleet management system 620 may send the same operational plan to multiple AVs 610. In some embodiments, the fleet management system 620 may send the same operational plan to AVs 610 operating in the same area, operating at the same time of period, operating for providing the same type of service, and so on. The AVs 610, after receiving the operational plan, may be able to dynamically modify the operational plan based on information the AVs 610 obtain during their operations to maximize utilization and efficiency and minimize safety risks.

The fleet management system 620 may also provide software ("AV software") to the fleet of AVs 610. The software, when executed by processors, may control operations of the AVs 610, e.g., based on the operational plan. The fleet management system 620 may provide different software to different AVs 610. The fleet management system 620 may also update software, e.g., by changing one or more components in a version of the AV software and releasing a new software version. The fleet management system 620 may also provide information to AVs 610 for the AVs 610 to operate based on the information. Certain aspects of the fleet management system 620 are described below in conjunction with FIG. 7.

A client device 630 may be a device capable of communicating with the fleet management system 620, e.g., via one or more networks. The client device 630 can transmit data to the fleet management system 620 and receive data from the fleet management system 620. The client device 630 can also receive user input and provide outputs. In some embodiments, outputs of the client devices 630 are in human-perceptible forms, such as text, graphics, audio, video, and so on. The client device 630 may include various output components, such as monitors, speakers, headphones, projectors, and so on. The client device 630 may be a desktop or a laptop computer, a smartphone, a mobile telephone, a PDA, or another suitable device.

In some embodiments, a client device 630 executes an application allowing a user 635 of the client device 630 to interact with the fleet management system 620. For example, a client device 630 executes a browser application to enable interaction between the client device 630 and the fleet management system 620 via a network. In another embodiment, a client device 630 interacts with the fleet management system 620 through an application programming interface (API) running on a native operating system of the client device 630, such as IOS® or ANDROID™. The application may be provided and maintained by the fleet management system 620. The fleet management system 620 may also update the application and provide the update to the client device 630.

In some embodiments, a user 635 may submit one or more service requests to the fleet management system 620 through a client device 630. A client device 630 may provide its user 635 a user interface (UI), through which the user 635 can make service requests, such as ride request (e.g., a request to pick up a person from a pickup location and drop off the person at a destination location), delivery request (e.g., a request to deliver one or more items from a location to another location), and so on. The UI may allow users 635 to provide locations (e.g., pickup location, destination location, etc.) or other information that would be needed by AVs 610 to provide services requested by the users 635. The client device 630 may also provide the user 635 an UI through which the user 635 may specify preference for AV motions during an AV service that has been requested or to be requested by the user 635. For example, the user 635 may specify, through the UI, how fast the user 635 prefers the AV 610 to move, turn, stop, accelerate, or decelerate.

The AV 610 is preferably a fully autonomous automobile, but may additionally or alternatively be any semi-autonomous or fully autonomous vehicle, e.g., a boat, an unmanned aerial vehicle, a driverless car, etc. Additionally, or alternatively, the AV 610 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 620 are non-autonomous vehicles dispatched by the fleet management system 620, and the vehicles are driven by human drivers according to instructions provided by the fleet management system 620.

The AV 610 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 610 may additionally or alternatively include interfaces for control of any other vehicle functions, e.g., windshield wipers, headlights, turn indicators, air conditioning, etc.

The sensor suite 640 may detect conditions inside and outside the AV 610. For instance, the sensor suite 640 may detect conditions in an environment surrounding the AV 610. The sensor suite 640 may include a computer vision ("CV") system, localization sensors, and driving sensors. For example, the sensor suite 640 may include interior and exterior cameras, RADAR sensors, sonar sensors, LIDAR sensors, thermal sensors, wheel speed sensors, inertial measurement units (IMUs), accelerometers, microphones, strain gauges, pressure monitors, barometers, thermometers, altimeters, ambient light sensors, etc. The sensors may be located in various positions in and around the AV 610. For example, the AV 610 may have multiple cameras located at different positions around the exterior and/or interior of the AV 610. Certain sensors of the sensor suite 640 are described further in relation to FIG. 7.

The onboard computer 650 is connected to the sensor suite 640 and functions to control the AV 610 and to process sensed data from the sensor suite 640 and/or other sensors to determine the state of the AV 610. Based upon the vehicle state and programmed instructions, the onboard computer 650 modifies or controls behavior of the AV 610. The onboard computer 650 may be preferably a general-purpose computer adapted for I/O communication with vehicle control systems and sensor suite 640 but may additionally or alternatively be any suitable computing device. The onboard computer 650 is preferably connected to the Internet via a wireless connection (e.g., via a cellular data connection). Additionally or alternatively, the onboard computer 650 may be coupled to any number of wireless or wired communication systems.

In some embodiments, the onboard computer 650 is in communication with the fleet management system 620, e.g., through a network. The onboard computer 650 may receive instructions from the fleet management system 620 and control behavior of the AV 610 based on the instructions. For example, the onboard computer 650 may receive from the fleet management system 620 an instruction for providing a ride to a user 635. The instruction may include information of the ride (e.g., pickup location, drop-off location, intermediate stops, etc.), information of the user 635 (e.g., identifying information of the user 635, contact information of the user 635, etc.). The onboard computer 650 may determine a navigation route of the AV 610 based on the instruction.

As another example, the onboard computer 650 may receive from the fleet management system 620 a request for sensor data to be used for determining environmental conditions. The onboard computer 650 may control one or more sensors of the sensor suite 640 to detect the user 635, the AV 610, or an environment surrounding the AV 610 based on the instruction and further provide the sensor data from the sensor suite 640 to the fleet management system 620. The onboard computer 650 may transmit other information requested by the fleet management system 620, such as perception of the AV 610 that is determined by a perception module of the onboard computer 650, historical data of the AV 610, and so on. Certain aspects of the onboard computer 650 are described further in relation to FIG. 6.

Example Fleet Management System

Figure 7:
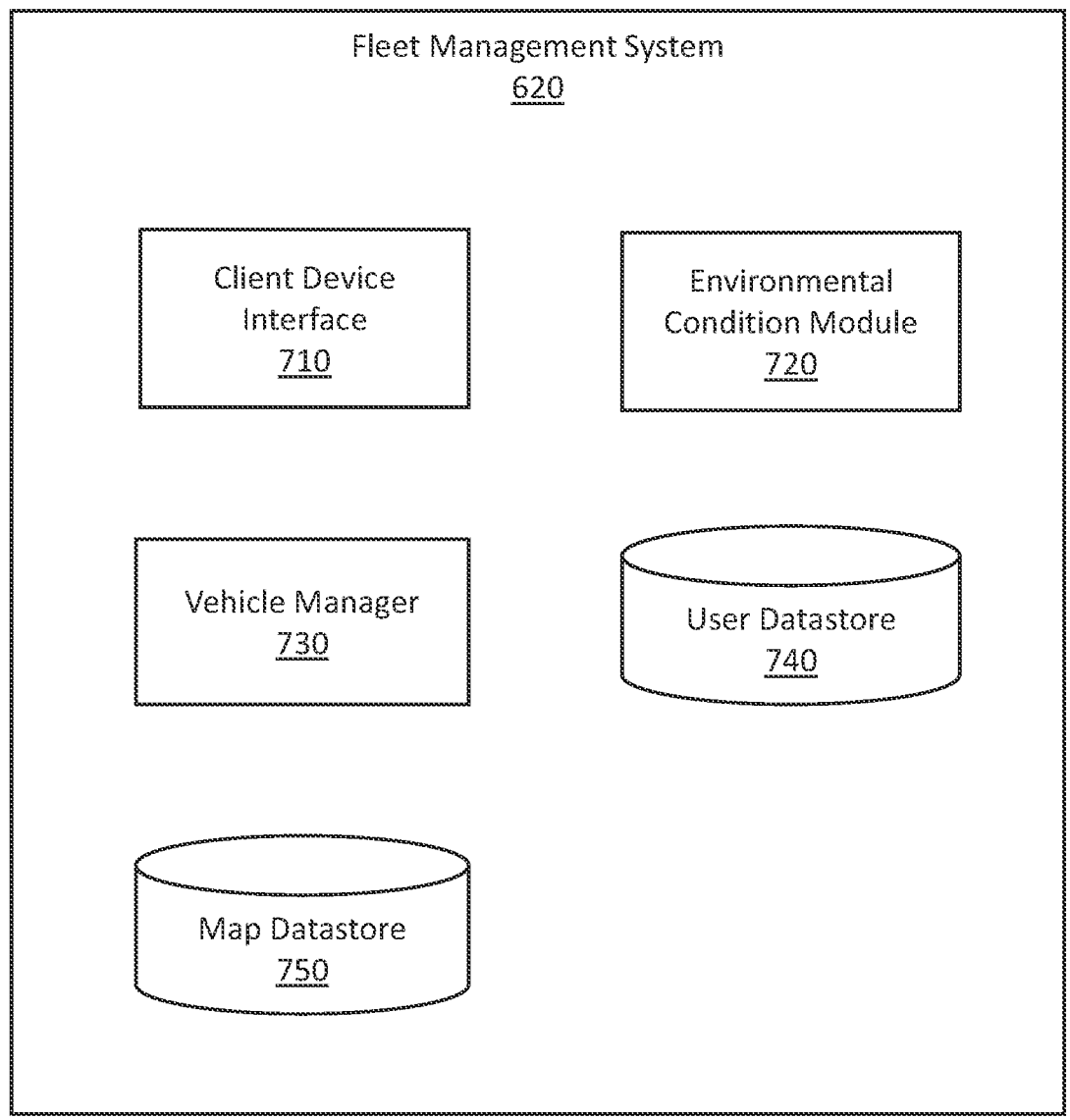
FIG. 7 is a block diagram showing a fleet management system, according to some embodiments of the present disclosure.

FIG. 7 is a block diagram showing the fleet management system 620, according to some embodiments of the present disclosure. The fleet management system 620 may manage and monitor AVs, e.g., AVs 610 in FIG. 6. In FIG. 7, the fleet management system 620 includes a client device interface 710, an environmental condition module 720, a vehicle manager 730, a user datastore 740, and a map datastore 750. In alternative configurations, different and/or additional components may be included in the fleet management system 620. Further, functionality attributed to one component of the fleet management system 620 may be accomplished by a different component included in the fleet management system 620 or a different system than those illustrated, such as the onboard computer 650.

The client device interface 710 may provide interfaces to client devices, such as headsets, smartphones, tablets, computers, and so on. The client device interface 710 may provide one or more apps or browser-based interfaces that can be accessed by users, such as the users 635, using client devices, such as the client devices 630. The client device interface 710 enables the users to submit requests to a ride service provided or enabled by the fleet management system 620. In an example, the client device interface 710 enables a user to submit a ride request that includes an origin (or pickup) location and a destination (or drop-off) location. The ride request may include additional information, such as a number of passengers traveling with the user, and whether or not the user is interested in a shared ride with one or more other passengers not known to the user. The client device interface 710 may enable the users to express their preferences for certain motions of the AV. The client device interface 710 may allow a user to indicate the user's preference for the AV's speed, acceleration rate, deceleration rate, jerk, snap, curvature, and so on. For instance, the client device interface 710 may allow a user to select whether the user prefers slow braking, normal braking, or harsh braking.

The environmental condition module 720 obtains information of environmental conditions in association with operations of AVs. An environmental condition is a condition in an environment surrounding the AV. The condition may be a condition of an object (e.g., building, structure, tree, vehicle, traffic sign, person, etc.) in the environment, a weather condition (e.g., rain, snow, ice, etc.), a road condition (e.g., road curvature, road slope angle, road closure, number of lanes, lane width, presence of turn-only lane, etc.), a traffic condition (e.g., traffic jam, accident, etc.), or other types of environmental conditions. The environmental condition module 720 may detect an environmental condition based on data (e.g., sensor data, perceptions, etc.) from one or more AVs, such as the AV operating in the environment, the same AV operating in the environment at a different time, or another AV operating in the environment. The environmental condition module 720 may request such data from AVs.

In some embodiment, the environmental condition module 720 may search for one or more AVs that operate in the environment at or near a time of interest (e.g., the time of an AV behavior) and after finding these AVs, the environmental condition module 720 can request data from these AVs. In some embodiments (e.g., embodiments where the environmental condition module 720 cannot find any AV operating in the environment but for the AV providing the service), the environmental condition module 720 may request the vehicle manager 760 to send an AV to the environment and capture data needed by the environmental condition module 720. The environmental condition module 720 may provide an instruction to the AV. The instruction may include information of the environment (e.g., location), information of objects that need to be detected, specification of sensors to be used, setting of sensors, and so on.

The environmental condition module 720 may also use other data to detect environmental conditions. For instance, the environmental condition module 720 may retrieve data from a third-party system that publishes information related to environmental conditions. The third-party system may be a third-party reporting traffic conditions, a third-party predicting weather conditions, a social-media system, and so on.

The vehicle manager 730 manages and communicates with the fleet of AVs. The vehicle manager 730 assigns the AVs to various tasks, such as service tasks. The vehicle manager 730 can also direct the operations of the AVs in the fleet by providing operational plans to the AVs. The vehicle manager 730 may generate operational plans based on data from other components of the fleet management system 620, such as the client device interface 710, the environmental condition module 720, the user datastore 740, or the map datastore 750, or some combination thereof. The data may be obtained by these components of the fleet management system 620 before the operations of the AVs are performed based on the operational plans. The vehicle manager 730 may request or extract data, which is relevant to the operations of the AVs, from one or more of these components of the fleet management system 620.

In the process of generating an operational plan, the vehicle manager 730 may define one or more operational limitations based on the data. An example limitation may be a limitation on a movement of the AV 610 during the operation, such as a speed limit, acceleration limit, deceleration limit, jerk limit (e.g., a limit on acceleration rate or deceleration rate), curvature limit, snap limit, and so on. Another example limitation may be a limitation on the environment where the AV 610 will operate. For instance, the operational plan may specify one or more geofenced areas, one or more weather conditions, one or more road conditions, and so on. Yet another example limitation may be a limitation on the time when the AV will operate. For instance, the operational plan may specify a start time, an end time, or a duration of time of the operation of the AV 610. Yet another example limitation may be a limitation on an attribute of the AV during the operation, such as the AV's location, orientation, battery charge level, and so on. In some embodiments, the operational plan may include a limitation that is a combination of multiple limitations. For instance, the operational plan may specify a geofenced area where the AV 610 can drive for a particular time of period, a speed limit below which the AV 610 can drive under a particular weather condition, and so on.

The vehicle manager 730 may transmit an operational plan to an AV that receives a service task. For instance, the vehicle manager 730 can send the operational plan to the onboard computer (e.g., the onboard computer 650) of the AV. The vehicle manager 730 may generate different operational plans for different geographical regions where the AVs 610 will operate or for different types of service tasks to be performed by the AVs 610. In some embodiments, the vehicle manager 730 may periodically update operational plans as the data relevant to the operations of the AVs may change over time. Additionally or alternatively, the vehicle manager 730 may update an operational plan upon a request from an AV. For instance, an AV may determine that one or more limitations in the operational plan are not applicable anymore and request the vehicle manager 730 to update the limitations. The AV may provide information that the vehicle manager 730 can use to update the operational plan.

In some embodiments, the vehicle manager 730 selects AVs from the fleet to perform various tasks and instructs the AVs to perform the tasks. For example, the vehicle manager 730 receives a ride request from the client device interface 710. The vehicle manager 730 selects an AV to service the ride request based on the information provided in the ride request, e.g., the origin and destination locations. If multiple AVs in the AV fleet are suitable for servicing the ride request, the vehicle manager 730 may match users for shared rides based on an expected compatibility. For example, the vehicle manager 730 may match users with similar user interests, e.g., as indicated by the user datastore 740. In some embodiments, the vehicle manager 730 may match users for shared rides based on previously-observed compatibility or incompatibility when the users had previously shared a ride.

The vehicle manager 730 or another system may maintain or access data describing each of the AVs in the fleet of AVs, including current location, service status (e.g., whether the AV is available or performing a service; when the AV is expected to become available; whether the AV is schedule for future service), fuel or battery level, etc. The vehicle manager 730 may select AVs for service in a manner that optimizes one or more additional factors, including fleet distribution, fleet utilization, and energy consumption. The vehicle manager 730 may interface with one or more predictive algorithms that project future service requests and/or vehicle use and select vehicles for services based on the projections.

The vehicle manager 730 transmits instructions dispatching the selected AVs. In particular, the vehicle manager 730 instructs a selected AV to drive autonomously to a pickup location in the ride request and to pick up the user and, in some cases, to drive autonomously to a second pickup location in a second ride request to pick up a second user. The first and second user may jointly participate in a virtual activity, e.g., a cooperative game or a conversation. The vehicle manager 730 may dispatch the same AV to pick up additional users at their pickup locations, e.g., the AV may simultaneously provide rides to three, four, or more users. The vehicle manager 730 further instructs the AV to drive autonomously to the respective destination locations of the users.

In some embodiments, the vehicle manager 730 may instruct AVs to drive to other locations while not servicing a user, e.g., to improve geographic distribution of the fleet, to anticipate demand at particular locations, etc. The vehicle manager 730 may also instruct AVs to return to an AV facility for fueling, inspection, maintenance, or storage.

The user datastore 740 stores information associated with users 635. The user datastore 740 stores information associated with rides requested or taken by the user 635. For instance, the user datastore 740 may store information of a ride currently being taken by a user 635, such as an origin location and a destination location for the user's current ride. The user datastore 740 may also store historical ride data for a user 635, including origin and destination locations, dates, and times of previous rides taken by a user. The user datastore 740 may also store expressions of the user 635 that are associated with a current ride or historical ride. In some cases, the user datastore 740 may further store future ride data, e.g., origin and destination locations, dates, and times of planned rides that a user has scheduled with the ride service provided by the AVs and fleet management system 620. Some or all of the information of a user 635 in the user datastore 740 may be received through the client device interface 710, an onboard computer (e.g., the onboard computer 650), a sensor suite of AVs (e.g., the sensor suite 640), a third-party system associated with the user and the fleet management system 620, or other systems or devices.

In some embodiments, the user datastore 740 stores data indicating user sentiments towards AV behaviors associated with ride services, such as information indicating whether a user feels comfortable or secured with an AV behavior. The fleet management system 620 may include one or more learning modules (not shown in FIG. 7) to learn user sentiments based on user data associated with AV rides, such as user expressions related to AV rides. The user datastore 740 may also store data indicating user interests associated with rides provided by AVs. The fleet management system 620 may include one or more learning modules (not shown in FIG. 7) to learn user interests based on user data. For example, a learning module may compare locations in the user datastore 740 with map datastore 750 to identify places the user has visited or plans to visit. For example, the learning module may compare an origin or destination address for a user in the user datastore 740 to an entry in the map datastore 750 that describes a building at that address. The map datastore 750 may indicate a building type, e.g., to determine that the user was picked up or dropped off at an event center, a restaurant, or a movie theater. In some embodiments, the learning module may further compare a date of the ride to event data from another data source (e.g., a third-party event data source, or a third-party movie data source) to identify a more particular interest, e.g., to identify a performer who performed at the event center on the day that the user was picked up from an event center, or to identify a movie that started shortly after the user was dropped off at a movie theater. This interest (e.g., the performer or movie) may be added to the user datastore 740.

In some embodiments, a user 635 is associated with a user profile stored in the user datastore 740. A user profile may include declarative information about the user 635 that was explicitly shared by the user 635 and may also include profile information inferred by the fleet management system 620. In one embodiment, the user profile includes multiple data fields, each describing one or more attributes of the user 635. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, an image of a user 635 may be tagged with information identifying the user 635 displayed in the image.

The map datastore 750 stores a detailed map of environments through which the AVs may travel. The map datastore 750 includes data describing roadways, such as e.g., locations of roadways, connections between roadways, roadway names, speed limits, traffic flow regulations, toll information, etc. The map datastore 750 may further include data describing buildings (e.g., locations of buildings, building geometry, building types), and data describing other objects (e.g., location, geometry, object type) that may be in the environments of AV. The map datastore 750 may also include data describing other features, such as bike lanes, sidewalks, crosswalks, traffic lights, parking lots, signs, billboards, etc.

Some of the map datastore 750 may be gathered by the fleet of AVs. For example, images obtained by the exterior sensors 810 of the AVs may be used to learn information about the AVs' environments. As one example, AVs may capture images in a residential neighborhood during a Christmas season, and the images may be processed to identify which homes have Christmas decorations. The images may be processed to identify particular features in the environment. For the Christmas decoration example, such features may include light color, light design (e.g., lights on trees, roof icicles, etc.), types of blow-up figures, etc. The fleet management system 620 and/or AVs may have one or more image processing modules to identify features in the captured images or other sensor data. This feature data may be stored in the map datastore 750. In some embodiments, certain feature data (e.g., seasonal data, such as Christmas decorations, or other features that are expected to be temporary) may expire after a certain period of time. In some embodiments, data captured by a second AV may indicate that a previously-observed feature is no longer present (e.g., a blow-up Santa has been removed) and in response, the fleet management system 620 may remove this feature from the map datastore 750.

Example Sensor Suite

Figure 8:
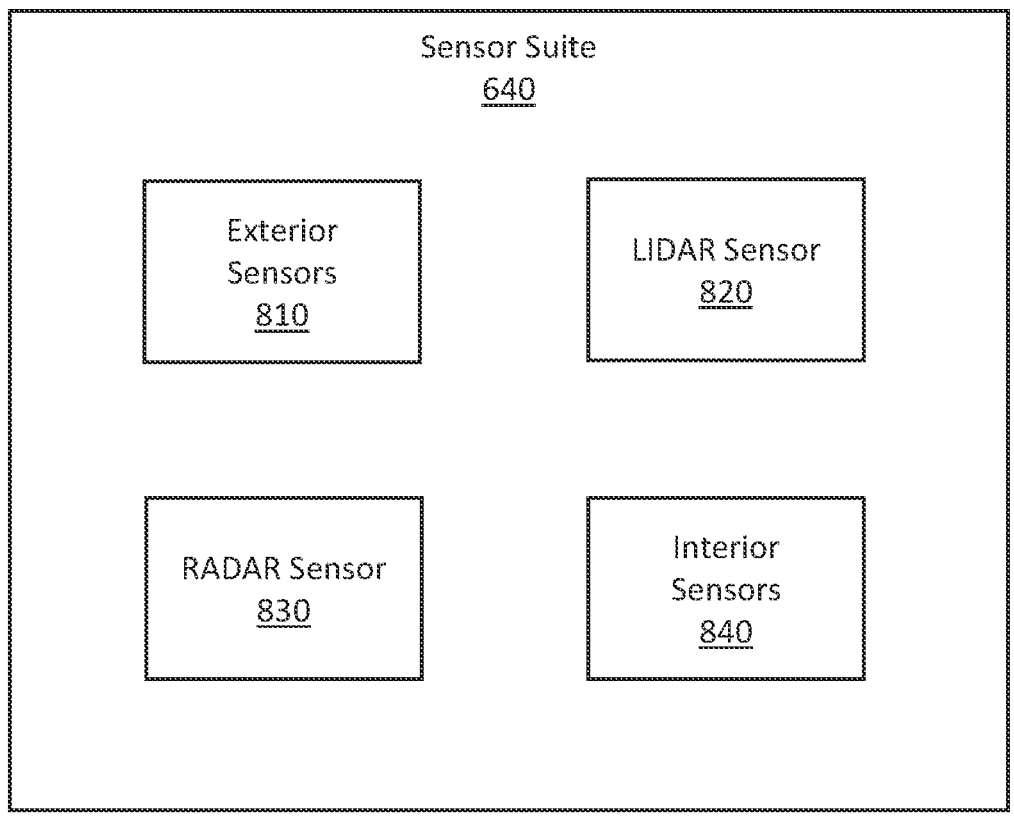
FIG. 8 is a block diagram showing a sensor suite, according to some embodiments of the present disclosure.

FIG. 8 is a block diagram showing the sensor suite 640, according to some embodiments of the present disclosure. The sensor suite 640 may be an onboard sensor suite of an AV, e.g., AV 610 in FIG. 6. The sensor suite 640 includes exterior sensors 810, a LIDAR sensor 820, a RADAR sensor 830, and interior sensors 840. The sensor suite 640 may include any number of the types of sensors shown in FIG. 8, e.g., one or more LIDAR sensors 820, one or more RADAR sensors 830, etc. The sensor suite 640 may have more types of sensors than those shown in FIG. 8, such as the sensors described with respect to FIG. 6. In other embodiments, the sensor suite 640 may not include one or more of the sensors shown in FIG. 8.

The exterior sensors 810 may detect objects in an environment around the AV. The environment may include a scene in which the AV operates. Example objects include objects related to weather (e.g., fog, rain, snow, haze, etc.), persons, buildings, traffic lights, traffic signs, vehicles, street signs, trees, plants, animals, or other types of objects that may be present in the environment around the AV. In some embodiments, the exterior sensors 810 include exterior cameras having different views, e.g., a front-facing camera, a back-facing camera, and side-facing cameras. One or more exterior sensors 810 may be implemented using a high-resolution imager with a fixed mounting and field of view. One or more exterior sensors 810 may have an adjustable field of views and/or adjustable zooms. In some embodiments, the exterior sensors 810 may operate continually during operation of the AV. In an example embodiment, the exterior sensors 810 capture sensor data (e.g., images, etc.) of a scene in which the AV drives. In other embodiment, the exterior sensors 810 may operate in accordance with an instruction from the onboard computer 650 or an external system, such as the vehicle manager 730 of the fleet management system 620. Some of all of the exterior sensors 810 may capture sensor data of one or more objects in an environment surrounding the AV based on the instruction.

The LIDAR sensor 820 may measure distances to objects in the vicinity of the AV using reflected laser light. The LIDAR sensor 820 may be a scanning LIDAR that provides a point Cloud of the region scanned. The LIDAR sensor 820 may have a fixed field of view or a dynamically configurable field of view. The LIDAR sensor 820 may produce a point cloud that describes, among other things, distances to various objects in the environment of the AV.

The RADAR sensor 830 may measure ranges and speeds of objects in the vicinity of the AV using reflected radio waves. The RADAR sensor 830 may be implemented using a scanning RADAR with a fixed field of view or a dynamically configurable field of view. The RADAR sensor 830 may include one or more articulating RADAR sensors, long-range RADAR sensors, short-range RADAR sensors, or some combination thereof.

The interior sensors 840 may detect the interior of the AV, such as objects inside the AV. Example objects inside the AV include users (e.g., passengers), client devices of users, components of the AV, items delivered by the AV, items facilitating services provided by the AV, and so on. The interior sensors 840 may include multiple interior cameras to capture different views, e.g., to capture views of an interior feature, or portions of an interior feature. The interior sensors 840 may be implemented with a fixed mounting and fixed field of view, or the interior sensors 840 may have adjustable field of views and/or adjustable zooms, e.g., to focus on one or more interior features of the AV. The interior sensors 840 may transmit sensor data to a perception module (such as the perception module 930 described below in conjunction with FIG. 9), which can use the sensor data to classify a feature and/or to determine a status of a feature.

In some embodiments, the interior sensors 840 include one or more input sensors that allow users 635 to provide input. For instance, a user 635 may use an input sensor to provide information indicating his/her preference for one or more motions of the AV during the ride. The input sensors may include touch screen, microphone, keyboard, mouse, or other types of input devices. In an example, the interior sensors 840 include a touch screen that is controlled by the onboard computer 650. The onboard computer 650 may present questionnaires on the touch screen and receive user answers to the questionnaires through the touch screen. A questionnaire may include one or more questions about AV motions. The onboard computer 650 may receive the questions from the fleet management system 620. In some embodiments, some or all of the interior sensors 840 may operate continually during operation of the AV. In other embodiment, some or all of the interior sensors 840 may operate in accordance with an instruction from the onboard computer 650 or an external system, such as the fleet management system 620.

Example Onboard Computer

Figure 9:
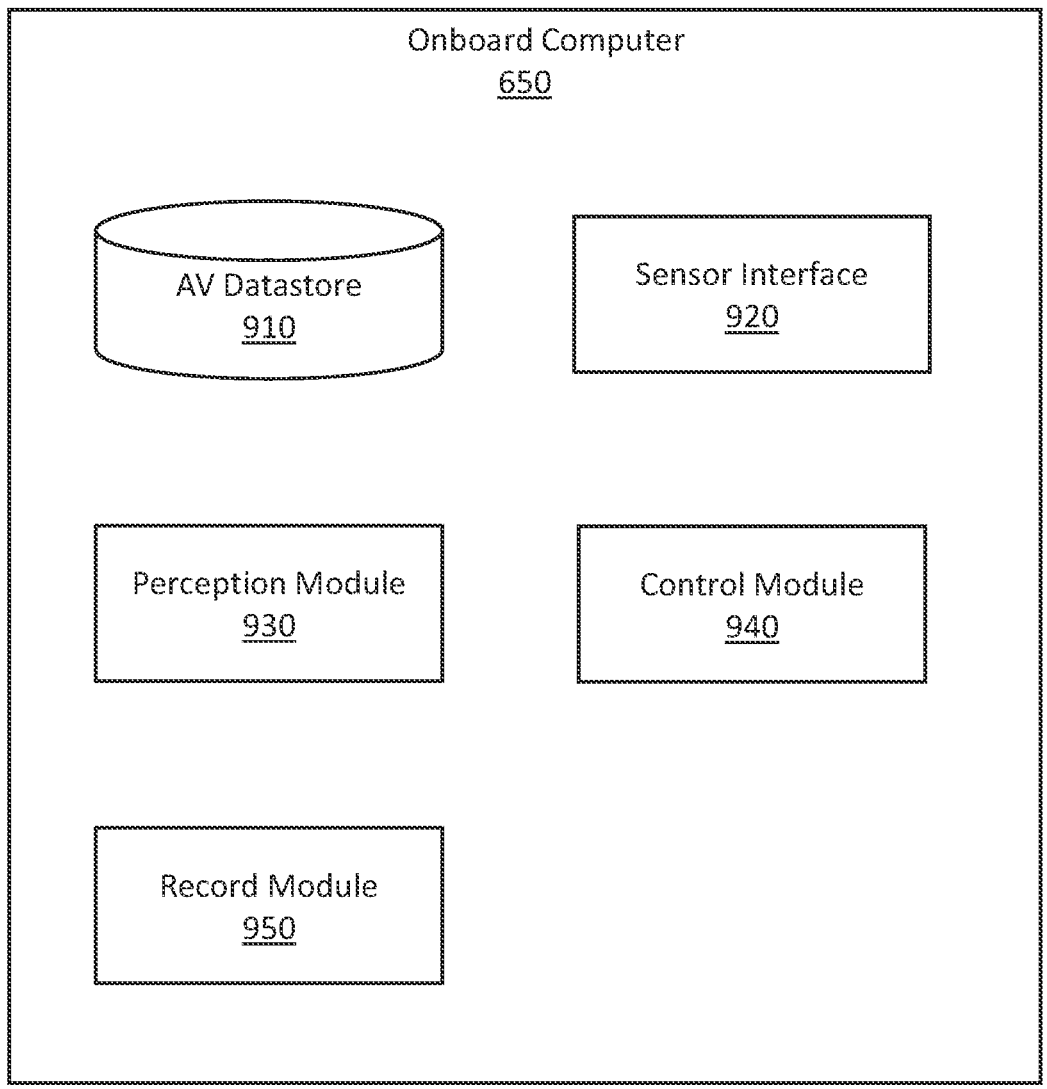
FIG. 9 is a block diagram showing an onboard computer, according to some embodiments of the present disclosure.

FIG. 9 is a block diagram showing the onboard computer 650 according to some embodiments of the present disclosure. The onboard computer 650 may control an AV, e.g., AV 610 in FIG. 6. As shown in FIG. 9, the onboard computer 650 includes an AV datastore 910, a sensor interface 920, a perception module 930, a control module 940, and a record module 950. In alternative configurations, fewer, different and/or additional components may be included in the onboard computer 650. For example, components and modules for conducting route planning, controlling movements of the AV, and other vehicle functions are not shown in FIG. 9. Further, functionality attributed to one component of the onboard computer 650 may be accomplished by a different component included in the onboard computer 650 or a different system, such as the fleet management system 620.

The AV datastore 910 stores data associated with operations of the AV. The AV datastore 910 may store one or more operation records of the AV. An operation record is a record of an operation of the AV, e.g., an operation for providing a ride service. The operation may be a currently performed operation or a previously performed operation ("previous operation" or "historical operation"). The operation record may include information indicating operational behaviors of the AV during the operation. The operational behaviors may include sensor detection, movement, stop, battery charging, calibration, maintenance, communication with the fleet management system 620, communication with assistance agent, communication with user, communication with another AV, and so on. The operations record may also include data used, received, or captured by the AV during the operation, such as map data, instructions from the fleet management system 620, sensor data captured by the AV's sensor suite, and so on. In some embodiments, the AV datastore 910 stores a detailed map that includes a current environment of the AV. The AV datastore 910 may store data in the map datastore 750. In some embodiments, the AV datastore 910 stores a subset of the map datastore 750, e.g., map data for a city or region in which the AV is located.

The data in the AV datastore 910 may include data generated by the AV itself. The data may include sensor data capturing one or more environments where the AV operates, e.g., operates to provide services. The sensor data may be from the sensor suite 640 of the AV. The data in the AV datastore 910 may also include perception data that identifies one or more environmental conditions. The perfection data may be from the perception module 930 of the onboard computer 650 of the AV. The data may also include external data, e.g., data from other AVs or systems. For example, the data in the AV datastore 910 may include data (e.g., sensor data, perception, etc.) from one or more other AVs that capture one or more environments where the other AVs operate. As another example, the data in the AV datastore 910 may include data from the fleet management system 620, e.g., data about environmental conditions from the environmental condition module 720 or instructions (e.g., operational plans) from the vehicle manager 730. In yet another example, the data in the AV datastore 910 may include data from one or more third-party systems that provide information of environments where the AV operates. The AV may be in communication with the one or more third-party systems, e.g., through a network.

The sensor interface 920 interfaces with the sensors in the sensor suite 640. The sensor interface 920 may request data from the sensor suite 640, e.g., by requesting that a sensor capture data in a particular direction or at a particular time. For example, the sensor interface 920 instructs the sensor suite 640 to capture sensor data of an environment surrounding the AV, e.g., by sending a request for sensor data to the sensor suite 640. In some embodiments, the request for sensor data may specify which sensor(s) in the sensor suite 640 to provide the sensor data, and the sensor interface 920 may request the sensor(s) to capture data. The request may further provide one or more settings of a sensor, such as orientation, resolution, accuracy, focal length, and so on. The sensor interface 920 can request the sensor to capture data in accordance with the one or more settings.

A request for sensor data may be a request for real-time sensor data, and the sensor interface 920 can instruct the sensor suite 640 to immediately capture the sensor data and to immediately send the sensor data to the sensor interface 920. The sensor interface 920 is configured to receive data captured by sensors of the sensor suite 640, including data from exterior sensors mounted to the outside of the AV, and data from interior sensors mounted in the passenger compartment of the AV. The sensor interface 920 may have subcomponents for interfacing with individual sensors or groups of sensors of the sensor suite 640, such as a camera interface, a LIDAR interface, a RADAR interface, a microphone interface, etc.

The perception module 930 identifies objects and/or other features captured by the sensors of the AV. For example, the perception module 930 identifies objects in the environment of the AV and captured by one or more sensors (e.g., the sensors 710-230). As another example, the perception module 930 determines one or more environmental conditions based on sensor data from one or more sensors (e.g., the sensors 710-230). The perception module 930 may include one or more classifiers trained using machine learning to identify particular objects. For example, a multi-class classifier may be used to classify each object in the environment of the AV as one of a set of potential objects, e.g., a vehicle, a pedestrian, or a cyclist. As another example, a pedestrian classifier recognizes pedestrians in the environment of the AV, a vehicle classifier recognizes vehicles in the environment of the AV, etc. The perception module 930 may identify travel speeds of identified objects based on data from the RADAR sensor 830, e.g., speeds at which other vehicles, pedestrians, or birds are traveling. As another example, the perception module 93—may identify distances to identified objects based on data (e.g., a captured point cloud) from the LIDAR sensor 820, e.g., a distance to a particular vehicle, building, or other feature identified by the perception module 930. The perception module 930 may also identify other features or characteristics of objects in the environment of the AV based on image data or other sensor data, e.g., colors (e.g., the colors of Christmas lights), sizes (e.g., heights of people or buildings in the environment), makes and models of vehicles, pictures and/or words on billboards, etc.

In some embodiments, the perception module 930 fuses data from one or more interior sensors 840 with data from exterior sensors (e.g., exterior sensors 810) and/or AV datastore 910 to identify environmental objects that one or more users are looking at. The perception module 930 determines, based on an image of a user, a direction in which the user is looking, e.g., a vector extending from the user and out of the AV in a particular direction. The perception module 930 compares this vector to data describing features in the environment of the AV, including the features' relative location to the AV (e.g., based on real-time data from exterior sensors and/or the AV's real-time location) to identify a feature in the environment that the user is looking at.

While a single perception module 930 is shown in FIG. 9, in some embodiments, the onboard computer 650 may have multiple perception modules, e.g., different perception modules for performing different ones of the perception tasks described above (e.g., object perception, speed perception, distance perception, feature perception, facial recognition, mood determination, sound analysis, gaze determination, etc.).

The control module 940 controls behaviors of the AV based on an operational plan. The control module 940 can dynamically update the operational plan based on information obtained during the operation of the AV and control one or more behaviors of the AV based on the updated operational plan. The information may be received by the control module from another component of the onboard computer 650 (e.g., the sensor interface 920 or the perception module 930), from another AV, or from the fleet management system 620 or a different system. The information may indicate one or more environmental conditions, one or more user preferences, operational capability of one or more AV components (e.g., motor, brake, etc.), and so on.

The control module 940 may use the information to modify one or more limitations in the operational plan. The control module 940 may predict a performance of the AV operation within or beyond a limitation based on the information. The performance may be a safety risk, passenger comfort, or a combination of both. The control module 940 may determine a performance score that measures the predicted performance of the AV within or beyond the limitation. In embodiments where the control module 940 determines that the predicted performance is below a threshold performance (e.g., the safety risk is beyond a threshold risk level) if the AV operates within the limitation, the control module 940 may modify the limitation to improve the predicted performance. The modified limitation is more restrictive than the original limitation. In embodiments where the control module 940 determines that the predicted performance is above a threshold performance (e.g., the safety risk is above a threshold risk level) if the AV operates beyond the limitation, the control module 940 may modify the limitation to improve utilization or efficiency of the AV's operation. The modified limitation is less restrictive than the original limitation.

The control module 940 may update the operational plan multiple times during the AV's operation, e.g., based on changes in environmental conditions, user preferences, etc. The modification of the operational plan can therefore be dynamic. The modification of the operational plan can also be real-time. For instance, in response to receiving sensor data capturing a change in an environmental condition or user preference, the control module 940 determines whether to modify the operational plan. In some embodiments, the control module 940 may use a trained model to predict the performance of the AV. Additionally or alternatively, the control module 940 may use the performance of the AV in one or more historical operations to predict the performance of the AV. The historical operations may be performed by the AV in the same environment, under the same or similar environmental conditions, or upon service request from the same user or similar users.

In some embodiments, the operational plan may include one or more limitations that cannot be modified by the control module 940, such as limitations that were defined to meet a legal requirement. In some embodiments, the control module 940 may need to request for authorization before a limitation can be modified. For instance, the control module 940 may send a request for authorization of changing a limitation to the vehicle manager 730 or an agent of the fleet management system 620. The control module 940 may make the change after it receives the authorization. Alternatively, the vehicle manager 730 or an agent of the fleet management system 620 may change the limitation remotely.

In some embodiments, the control module 940 may include one or more planning modules (also referred to as "planners") that can plan motions of the AV during the AV's operations based on the dynamically updated operational plan. The planning module(s) may determine a motion parameter that specifies a motion to be performed by the AV in the operation. The motion parameter may be a speed, acceleration rate, deceleration rate, jerk, snap, curvature, orientation, etc. The motion parameter may have a value within a limitation specified in the operational plan. Different planning modules may make different plans for the AV. The planning modules may use different models to make the different plans. In some embodiments, the planning modules may produce a single plan for the operation of the AV. In an example, the planning modules may run in a sequence. For instance, a planning module may generate a plan, and another planning module may generate another plan based on the plan. The output from the last planning module in the sequence may be the final plan for the AV's operation. The output may include commands, e.g., commands to one or more actuators in the AV.

In some embodiments, the control module 940 controls operation of the AV by using a trained control model, such as a trained neural network. The control module 940 may provide input data to the control model, and the control model outputs operation parameters for the AV. The input data may include sensor data from the sensor interface 920 (which may indicate a current state of the AV), objects identified by the perception module 930, or both. The operation parameters are parameters indicating operation to be performed by the AV. The operation of the AV may include perception, prediction, planning, localization, motion, navigation, other types of operation, or some combination thereof.

The control module 940 may provide instructions to various components of the AV based on the output of the control model, and these components of the AV will operate in accordance with the instructions. In an example where the output of the control model indicates that a change of traveling speed of the AV is required given a prediction of traffic condition, the control module 940 may instruct the motor of the AV to change the traveling speed of the AV. In another example where the output of the control model indicates a need to detect characteristics of an object in the environment around the AV (e.g., detect a speed limit), the control module 940 may instruct the sensor suite 640 to capture an image of the speed limit sign with sufficient resolution to read the speed limit and instruct the perception module 930 to identify the speed limit in the image. In some embodiments, the control module 940 may control one or more actuators in the AV based on an output of one or more planners. In some embodiments, the control module 940 may execute commands in the output of a planner to drive operations of the one or more actuators. The operations of the actuators can cause the AV motions planned by the planner. Certain aspects of the control module 940 are provided below in conjunction with FIG. 5.

The record module 950 generates operation records of the AV and stores the operations records in the AV datastore 910. The record module 950 may generate an operation record in accordance with an instruction from the fleet management system 620, e.g., the vehicle manager 730. The instruction may specify data to be included in the operation record. The record module 950 may determine one or more timestamps for an operation record. In an example of an operation record for a ride service, the record module 950 may generate timestamps indicating the time when the ride service starts, the time when the ride service ends, times of specific AV behaviors associated with the ride service, and so on. The record module 950 can transmit the operation record to the fleet management system 620.

Example Method of Providing Trace-Based Survey

Figure 10:
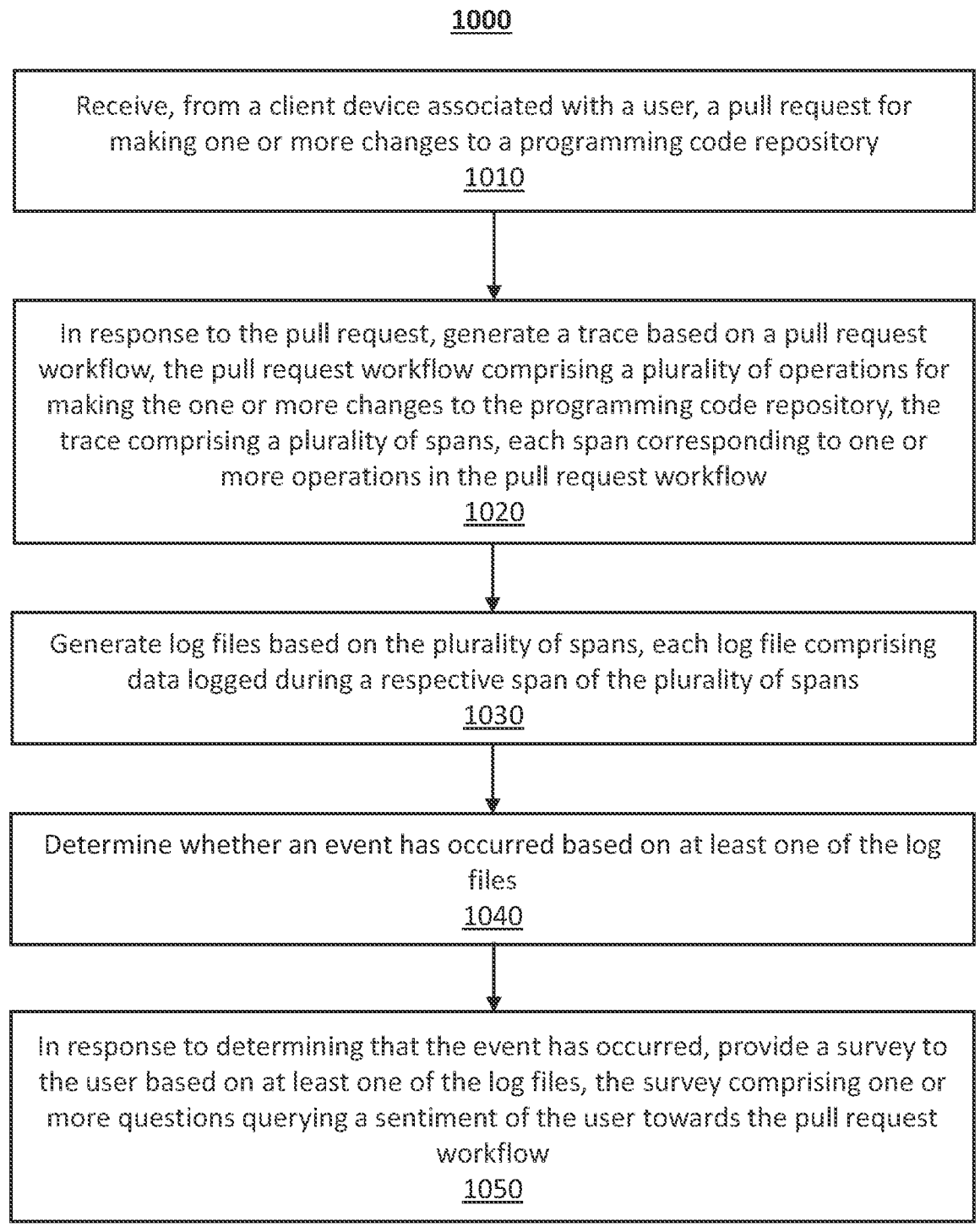
FIG. 10 is a flowchart showing a method of providing a trace-based survey, according to some embodiments of the present disclosure.

FIG. 10 is a flowchart showing a method 1000 of providing a trace-based survey, according to some embodiments of the present disclosure. The method 1000 may be performed by the pull request module 230. Although the method 1000 is described with reference to the flowchart illustrated in FIG. 10, many other methods of broadcasting vehicle capabilities to planning modules may alternatively be used. For example, the order of execution of the steps in FIG. 10 may be changed. As another example, some of the steps may be changed, eliminated, or combined.

The pull request module 230 receives, in 1010, from a client device associated with a user, a pull request for making one or more changes to a programming code repository. The programming code repository may include programming codes for more than one application, such as one or more applications run by the fleet management system 620 or the onboard computer 650.

In response to the pull request, the pull request module 230 generates, in 1020, a trace based on a pull request workflow. The pull request workflow includes a plurality of operations for making the one or more changes to the programming code repository. The trace includes a plurality of spans. Each span corresponds to one or more operations in the pull request workflow. An example of the request workflow may be the request workflow 400 in FIG. 4.

The pull request module 230 generates, in 1030, log files based on the plurality of spans. Each log file includes data logged during a respective span of the plurality of spans. The log files may constitute one or more datasets of the trace. In some embodiments, one or more log files may be a dataset. The trace may have multiple datasets that constitute a database.

The pull request module 230 determines, in 1050, whether an event has occurred based on at least one of the log files. In some embodiments, at least some spans of the plurality of spans are arranged in a sequence. A log file for a last span in the sequence comprises data describing the event. The pull request module 230 determines whether an event has occurred by determining whether the trace has completed based on the log file.

In some embodiments, the pull request module 230 determines whether the event has occurred by determining whether an operation in the pull request workflow has completed within a predetermined amount of time. In other embodiments, the pull request module 230 determines whether the event has occurred by determining whether the user has a predetermined sentiment towards the pull request workflow.

In response to determining that the event has occurred, the pull request module 230 provides, in 1060, a survey to the user based on at least one of the log files. The survey includes one or more questions querying a sentiment of the user towards the pull request workflow. In some embodiments, the pull request module 230 determines a sentiment of the user towards the pull request workflow and generates the one or more questions in the survey based on the sentiment of the user.

In some embodiments, the pull request module 230 determines whether an operation in the pull request workflow needs to be modified based on the user's response to the survey. For example, the pull request module 230 obtains a plurality of evaluations on a quality of the pull request workflow from one or more users. The one or more users comprises the user. The pull request module 230 associates each respective evaluation with one or more operations in the pull request workflow. The pull request module 230 generates a quality heatmap for the pull request workflow. The quality heatmap illustrates the plurality of operations in the pull request workflow and indicates a quality of the one or more operations. The quality of the one or more operations is determined based on the respective evaluation. The pull request module 230 determines whether the operation in the pull request workflow needs to be modified based on the quality heatmap.

SELECT EXAMPLES

Example 1 provides a method, including receiving, from a client device associated with a user, a pull request for making one or more changes to a programming code repository; in response to the pull request, generating a trace based on a pull request workflow, the pull request workflow including a plurality of operations for making the one or more changes to the programming code repository, the trace including a plurality of spans, each span corresponding to one or more operations in the pull request workflow; generating log files based on the plurality of spans, each log file including data logged during a respective span of the plurality of spans; determining whether an event has occurred based on at least one of the log files; and in response to determining that the event has occurred, providing a survey to the user based on at least one of the log files, the survey including one or more questions querying a sentiment of the user towards the pull request workflow.

Example 2 provides the method of example 1, where at least some spans of the plurality of spans are arranged in a sequence, and a log file for a last span in the sequence includes data describing the event.

Example 3 provides the method of example 2, where determining whether an event has occurred includes determining whether the trace has completed based on the log file.

Example 4 provides the method of any of the preceding examples, where an operation in the pull request workflow includes transmitting a request for an action by the user to the client device, and the event is lack of any response to the request from the client device a predetermined amount of time after the request is transmitted.

Example 5 provides the method of any of the preceding examples, where determining whether the event has occurred includes determining whether an operation in the pull request workflow has completed within a predetermined amount of time.

Example 6 provides the method of any of the preceding examples, where determining whether the event has occurred includes determining whether the user has a predetermined sentiment towards the pull request workflow.

Example 7 provides the method of any of the preceding examples, where providing the survey to the user includes determining a sentiment of the user towards the pull request workflow; and generating the one or more questions in the survey based on the sentiment of the user.

Example 8 provides the method of any of the preceding examples, further including determining whether an operation in the pull request workflow needs to be modified based on a response of the user to the survey.

Example 9 provides the method of example 8, where determining whether the operation in the pull request workflow needs to be modified includes obtaining a plurality of evaluations on a quality of the pull request workflow from one or more users, the one or more users including the user; associating each respective evaluation with one or more operations in the pull request workflow; generating a quality heatmap for the pull request workflow, the quality heatmap illustrating the plurality of operations in the pull request workflow and indicating a quality of the one or more operations, the quality of the one or more operations determined based on the respective evaluation; and determining whether the operation in the pull request workflow needs to be modified based on the quality heatmap.

Example 10 provides the method of any of the preceding examples, where the programming code repository includes programming codes for more than one application.

Example 11 provides one or more non-transitory computer-readable media storing instructions executable to perform operations, the operations including receiving, from a client device associated with a user, a pull request for making one or more changes to a programming code repository; in response to the pull request, generating a trace based on a pull request workflow, the pull request workflow including a plurality of operations for making the one or more changes to the programming code repository, the trace including a plurality of spans, each span corresponding to one or more operations in the pull request workflow; generating log files based on the plurality of spans, each log file including data logged during a respective span of the plurality of spans; determining whether an event has occurred based on at least one of the log files; and in response to determining that the event has occurred, providing a survey to the user based on at least one of the log files, the survey including one or more questions querying a sentiment of the user towards the pull request workflow.

Example 12 provides the one or more non-transitory computer-readable media of example 11, where at least some spans of the plurality of spans are arranged in a sequence, and a log file for a last span in the sequence includes data describing the event.

Example 13 provides the one or more non-transitory computer-readable media of example 11 or 12, where an operation in the pull request workflow includes transmitting a request for an action by the user to the client device, and the event is lack of any response to the request from the client device a predetermined amount of time after the request is transmitted.

Example 14 provides the one or more non-transitory computer-readable media of any one of examples 11-13, where determining whether the event has occurred includes determining whether an operation in the pull request workflow has completed within a predetermined amount of time.

Example 15 provides the one or more non-transitory computer-readable media of any one of examples 11-14, where determining whether the event has occurred includes determining whether the user has a predetermined sentiment towards the pull request workflow.

Example 16 provides the one or more non-transitory computer-readable media of any one of examples 11-15, where providing the survey to the user includes determining a sentiment of the user towards the pull request workflow; and generating the one or more questions in the survey based on the sentiment of the user.

Example 17 provides a computer system, including a computer processor for executing computer program instructions; and one or more non-transitory computer-readable media storing computer program instructions executable by the computer processor to perform operations including receiving, from a client device associated with a user, a pull request for making one or more changes to a programming code repository, in response to the pull request, generating a trace based on a pull request workflow, the pull request workflow including a plurality of operations for making the one or more changes to the programming code repository, the trace including a plurality of spans, each span corresponding to one or more operations in the pull request workflow, generating log files based on the plurality of spans, each log file including data logged during a respective span of the plurality of spans; determining whether an event has occurred based on at least one of the log files, and in response to determining that the event has occurred, providing a survey to the user based on at least one of the log files, the survey including one or more questions querying a sentiment of the user towards the pull request workflow.

Example 18 provides the computer system of example 17, where at least some spans of the plurality of spans are arranged in a sequence, and a log file for a last span in the sequence includes data describing the event.

Example 19 provides the computer system of example 17 or 18, where an operation in the pull request workflow includes transmitting a request for an action by the user to the client device, and the event is lack of any response to the request from the client device a predetermined amount of time after the request is transmitted.

Example 20 provides the computer system of any one of examples 17-19, where determining whether the event has occurred includes determining whether an operation in the pull request workflow has completed within a predetermined amount of time.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method, comprising:
receiving, from a client device associated with a user, a pull request for making one or more changes to a programming code repository;
in response to the pull request, generating a trace based on a pull request workflow, the pull request workflow comprising a plurality of operations for making the one or more changes to the programming code repository, the trace comprising a plurality of spans, each span corresponding to one or more operations in the pull request workflow;
generating log files based on the plurality of spans, each log file comprising data logged during a respective span of the plurality of spans;
determining whether an event has occurred based on at least one of the log files;
in response to determining that the event has occurred, providing a survey to the user based on at least one of the log files, the survey comprising one or more questions querying a sentiment of the user towards the pull request workflow; and
determining whether an operation in the pull request workflow needs to be modified based on a response of the user to the survey, wherein determining whether the operation in the pull request workflow needs to be modified comprises:
obtaining a plurality of evaluations on a quality of the pull request workflow from one or more users, the one or more users comprising the user;
associating each respective evaluation with one or more operations in the pull request workflow;
generating a quality heatmap for the pull request workflow, the quality heatmap illustrating the plurality of operations in the pull request workflow and indicating a quality of the one or more operations, the quality of the one or more operations determined based on the respective evaluation; and
determining whether the operation in the pull request workflow needs to be modified based on the quality heatmap.

2. The method of claim 1, wherein:
at least some spans of the plurality of spans are arranged in a sequence, and
a log file for a last span in the sequence comprises data describing the event.

3. The method of claim 2, wherein determining whether an event has occurred comprises:
determining whether the trace has completed based on the log file.

4. The method of claim 1, wherein an operation in the pull request workflow comprises transmitting a request for an action by the user to the client device, and the event is lack of any response to the request from the client device a predetermined amount of time after the request is transmitted.

5. The method of claim 1, wherein determining whether the event has occurred comprises:
determining whether an operation in the pull request workflow has completed within a predetermined amount of time.

6. The method of claim 1, wherein determining whether the event has occurred comprises:
determining whether the user has a predetermined sentiment towards the pull request workflow.

7. The method of claim 1, wherein providing the survey to the user comprises:
determining a sentiment of the user towards the pull request workflow; and
generating the one or more questions in the survey based on the sentiment of the user.

8. The method of claim 1, wherein the programming code repository comprises programming codes for more than one application.

9. One or more non-transitory computer-readable media storing instructions executable to perform operations, the operations comprising:
receiving, from a client device associated with a user, a pull request for making one or more changes to a programming code repository;
in response to the pull request, generating a trace based on a pull request workflow, the pull request workflow comprising a plurality of operations for making the one or more changes to the programming code repository, the trace comprising a plurality of spans, each span corresponding to one or more operations in the pull request workflow;
generating log files based on the plurality of spans, each log file comprising data logged during a respective span of the plurality of spans;
determining whether an event has occurred based on at least one of the log files;
in response to determining that the event has occurred, providing a survey to the user based on at least one of the log files, the survey comprising one or more questions querying a sentiment of the user towards the pull request workflow; and
determining whether an operation in the pull request workflow needs to be modified based on a response of the user to the survey, wherein determining whether the operation in the pull request workflow needs to be modified comprises:
obtaining a plurality of evaluations on a quality of the pull request workflow from one or more users, the one or more users comprising the user;
associating each respective evaluation with one or more operations in the pull request workflow;
generating a quality heatmap for the pull request workflow, the quality heatmap illustrating the plurality of operations in the pull request workflow and indicating a quality of the one or more operations, the quality of the one or more operations determined based on the respective evaluation; and
determining whether the operation in the pull request workflow needs to be modified based on the quality heatmap.

10. The one or more non-transitory computer-readable media of claim 9, wherein:
at least some spans of the plurality of spans are arranged in a sequence, and
a log file for a last span in the sequence comprises data describing the event.

11. The one or more non-transitory computer-readable media of claim 9, wherein an operation in the pull request workflow comprises transmitting a request for an action by the user to the client device, and the event is lack of any response to the request from the client device a predetermined amount of time after the request is transmitted.

12. The one or more non-transitory computer-readable media of claim 9, wherein determining whether the event has occurred comprises:
determining whether an operation in the pull request workflow has completed within a predetermined amount of time.

13. The one or more non-transitory computer-readable media of claim 9, wherein determining whether the event has occurred comprises:
    determining whether the user has a predetermined sentiment towards the pull request workflow.

14. The one or more non-transitory computer-readable media of claim 9, wherein providing the survey to the user comprises:
    determining a sentiment of the user towards the pull request workflow; and
    generating the one or more questions in the survey based on the sentiment of the user.

15. A computer system, comprising:
    a computer processor for executing computer program instructions; and
    one or more non-transitory computer-readable media storing computer program instructions executable by the computer processor to perform operations comprising:
        receiving, from a client device associated with a user, a pull request for making one or more changes to a programming code repository,
        in response to the pull request, generating a trace based on a pull request workflow, the pull request workflow comprising a plurality of operations for making the one or more changes to the programming code repository, the trace comprising a plurality of spans, each span corresponding to one or more operations in the pull request workflow,
        generating log files based on the plurality of spans, each log file comprising data logged during a respective span of the plurality of spans,
        determining whether an event has occurred based on at least one of the log files,
        in response to determining that the event has occurred, providing a survey to the user based on at least one of the log files, the survey comprising one or more questions querying a sentiment of the user towards the pull request workflow; and
        determining whether an operation in the pull request workflow needs to be modified based on a response of the user to the survey, wherein determining whether the operation in the pull request workflow needs to be modified comprises:
            obtaining a plurality of evaluations on a quality of the pull request workflow from one or more users, the one or more users comprising the user;
            associating each respective evaluation with one or more operations in the pull request workflow;
            generating a quality heatmap for the pull request workflow, the quality heatmap illustrating the plurality of operations in the pull request workflow and indicating a quality of the one or more operations, the quality of the one or more operations determined based on the respective evaluation; and
            determining whether the operation in the pull request workflow needs to be modified based on the quality heatmap.

16. The computer system of claim 15, wherein:
    at least some spans of the plurality of spans are arranged in a sequence, and
    a log file for a last span in the sequence comprises data describing the event.

17. The computer system of claim 15, wherein an operation in the pull request workflow comprises transmitting a request for an action by the user to the client device, and the event is lack of any response to the request from the client device a predetermined amount of time after the request is transmitted.

18. The computer system of claim 15, wherein determining whether the event has occurred comprises:
    determining whether an operation in the pull request workflow has completed within a predetermined amount of time.

* * * * *